Dec. 12, 1961 H. EPSTEIN ET AL 3,012,839

ELECTROGRAPHIC PRINTER

Filed July 15, 1954 5 Sheets-Sheet 1

INVENTORS
HERMAN EPSTEIN
FRANK T. INNES
BY
Edward J. Da Rin
AGENT

INVENTORS
HERMAN EPSTEIN
FRANK T. INNES
BY Edward J. Da Rin
AGENT

Dec. 12, 1961 H. EPSTEIN ET AL 3,012,839

ELECTROGRAPHIC PRINTER

Filed July 15, 1954 5 Sheets-Sheet 3

INVENTORS
HERMAN EPSTEIN
FRANK T. INNES
BY Edward J. DaRin
AGENT

INVENTORS
HERMAN EPSTEIN
FRANK T. INNES
BY
Edward J. Da Rin
AGENT

INVENTORS.
HERMAN EPSTEIN
FRANK T. INNES
BY
Edward J. Da Rin
AGENT 3,012,839

ELECTROGRAPHIC PRINTER

Herman Epstein, West Chester, and Frank T. Innes, Malvern, Pa., assignors to Burroughs Corporation, Detroit, Mich., a corporation of Michigan Filed July 15, 1954, Ser. No. 443,646

30 Claims. (Cl. 346—74)

This invention relates to electrical printing and more particularly to an electrical method and apparatus for making electrostatic images on a dielectric surface by electrical means which may be rendered permanently visible.

The use of the electrostatic phenomena in producing images has been developing to replace the conventional printing methods effected by mechanical pressure between a printing member and a recording medium. The transfer of ink from an inked printing member by the force produced by electric fields, magnetic fields and various combinations of both has been developed to increase the speed of printing and the reproduction of information. Electrostatic phenomena have been investigated further with respect to the high speed production of duplicates from a master or an original copy. As a result of the investigations, duplicating techniques were developed wherein the image forming or print forming steps combined the use of electrostatic and photochemical or photoconductive phenomena.

With the advent of the development and increase in usage of high speed electronic devices it became even more imperative that higher speed printing devices be developed to receive information in terms of electrical signals from the electronic devices and reproduce it on a recording member in some intelligible manner in the form of numbers, letters, coded information or other characters. Because of the speed differential between the relatively slow operating output equipment or printing devices and the associated high speed electronic equipment, it has been found necessary to store the information for a period in order to deliver it at the speed of the printing device. The use of electrostatic phenomena in combination with electrical signals requires precise control of both the input signal and the electrostatic phenomena. The input signal may be derived from an electronic computer or a storage device such as a punched card, magnetic tape, etc. The control circuitry normally required to convert this information may be cumbersome and override the advantages of using a particular recording method. The recording method itself must be of such a nature that it can be controlled within a desired predictable region to form a letter, numeral, etc. Preferably, the mechanical and/or electrical components of the recording method should not limit the speed of the recording system. Accordingly, a high speed recording system is desired that will employ economical control circuitry in combination with a reliable high speed recording unit that will not limit the speed of the system.

In the past the majority of investigations of the well-known Lichtenberg figures have been for purely theoretical reasons, and largely have been studied from photographic recordings. The photographic recordings have been extensively used for investigations of surge voltages on transmission lines. Although methods of forming the Lichtenberg figures on photographic and dielectric recording media have been known for a relatively long time, the adaptation of the figures into commercial devices has been limited.

The commercial adaptations of Lichtenberg figures in the study of surge voltages have been with relatively random discharges not requiring precise control. Also the recording devices may have been not only sensitive to an electrical discharge leading to Lichtenberg figure formation, but also to any random electrical phenomena of sufficient voltage to produce an image on the recording media. Therefore, the precise control required to pack a group of the electrostatic latent images of the proper size on a suitable recording medium presents controlling factors in the application of the images as a means of recording intelligence. The precise control required of a recording device employing Lichtenberg figures includes the initiation of an electrical discharge at the precise instance of time which will lead only to the formation of a Lichtenberg figure of the desired size at a specific area on the recording medium. This means that extraneous electrical phenomena in the nature of corona discharges, glow discharges and spark-like discharges have to be prevented by the means for controlling the desired electrical discharge in order to avoid the aforementioned phenomena and the erroneous marking of the recording medium as a result thereof. Furthermore, the recording of the electrostatic latent images on a recording medium suitable to allow the image to be rendered permanently visible, or detectable, introduces problems which were overcome by the present invention. One of the basic requirements of the recording medium is that it be of the appropriate dielectric, or electric charge retentive, material characterized by sufficient resistivity to retain the electrostatic latent images, the charged areas on the dielectric material, for a desired period. The recording medium must be uniform both in its physical and electrical characteristics not only for the production of satisfactory images but for high speed recording.

The process of rendering the images permanently visible, in applications where it is found to be desirable, introduces further factors which affect both the electrical control problem and the characteristic of the recording medium. This is particularly applicable when it is found desirable to heat process the recording medium as a step in rendering the electrostatic latent image permanently visible. The obvious characteristic required of the recording medium utilized in this manner is that it should have the correct thermal properties to suitably combine with the selected inking material. The inking material must not only be of a contrasting color from the recording medium to be easily readable, but also have the correct physical properties to adhere to the electrostatic latent images. The ink should also provide low background discoloration. The thermal properties of the ink are also a factor in the successful operation of a recording device when heat processing is required. The successful solutions of these various problems and the integration of them into a recording device has been found to provide not only a high speed means for marking or printing a recording medium, but one which is economical in construction and operation and highly satisfactory in image delineation.

The applications of the recording device in the form of a high speed printer of this nature are many and varied. Some of the more obvious applications are in the printing of the output of an electronic computer and the printing of names and addresses on a dick strip. It may be further combined as a unit to be utilized with a coded signal from a computer, or from a film, punched cards, tape and the like.

It is, therefore, a general object of the invention to provide an improved method of and apparatus for electrical recording.

It is an important object of the invention to provide an improved electrical recording method and system capable of operating at high speeds with a minimum of moving parts.

It is another important object of the invention to provide an economical high speed printing system which does not employ either the methods of transfer from a printing member or the use of photochemical phenomena.

It is still another important object of the invention to provide an improved dot sequential character forming system utilizing a novel method of controlling electrical discharge to produce the dot-like areas in the form of discrete electrostatic latent images.

It is a further important object of the invention to provide an improved high speed recording system utilizing discrete electrostatic latent images and an image developer formed of a homogeneous, dry, uncharged ink.

It is still a further important object of the invention to provide a new and improved means for electrical recording by means of controlled electrical discharges on a continuously rapidly moving recording medium.

It is yet a further important object of the invention to provide an improved intelligence recording system utilizing an improved means for distributing the electrical signals.

It is another important object of the invention to provide an improved method of and apparatus for dot-sequential electrical recording utilizing input pulses distributed in a novel manner to control the formation of a plurality of electrostatic dot-like latent images, or electrically charged areas, on a rapidly advancing recording medium.

Generally, the invention comprises means for receiving input information and for sequentially distributing the same to a recording device or head which is designed to impress electrostatic latent images in the form of Lichtenberg figures upon a suitable recording medium. The input information is applied to the recording head in terms of controlled pulses in order to initiate silent, invisible electrical discharges. Each electrical discharge is intercepted by a dielectric medium of suitable resistivity to store an electrostatic latent image thereon. The formation of the images is controlled in a time sequence to record the information in terms of symbols such as dots, marks, letters, characters, etc., or any combination of same. The electrostatic latent image may at that time or later be rendered visible by the application of an improved inking substance to the electrostatic image.

Other objects and features of advantage of the present invention will be found throughout the following more detailed description of the invention, particularly when considered with the accompanying drawings in which like reference characters refer to similar elements.

Figures 3, 4, 4A:
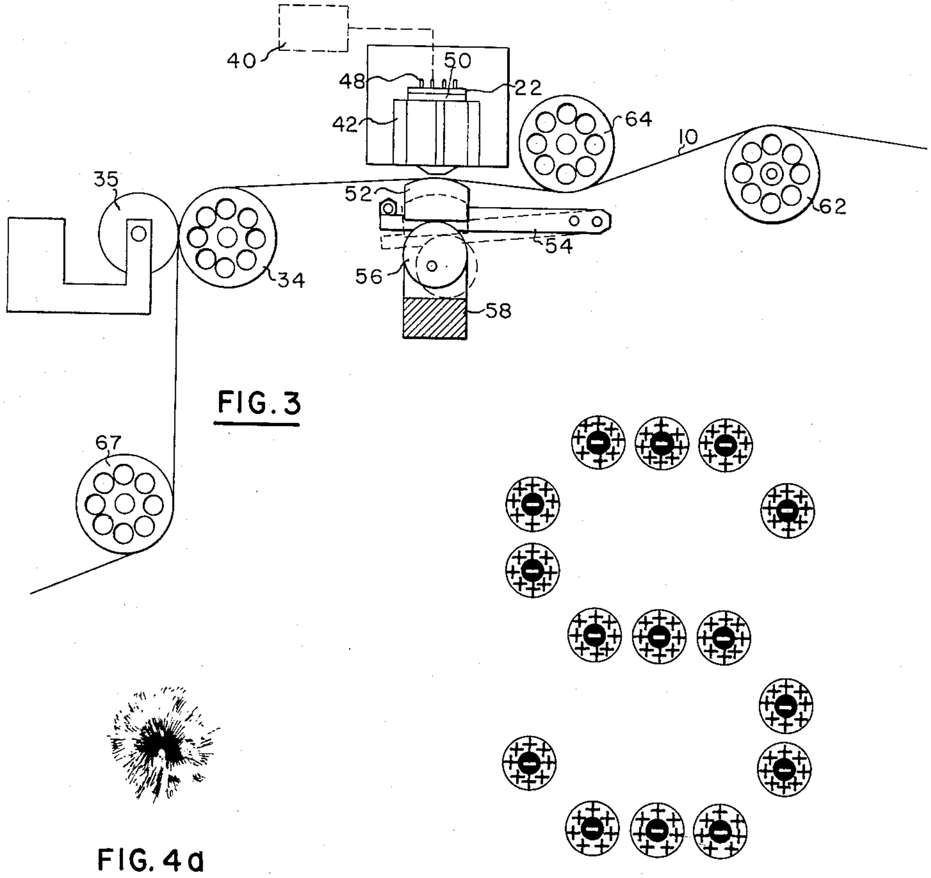
FIG. 3 is an enlarged elevation view of the recording portion of the system illustrated in FIG. 1.
FIG. 4 is an enlarged view of the letter "S" illustrated as developed by one form of electrostatic latent images.
Figure 5:
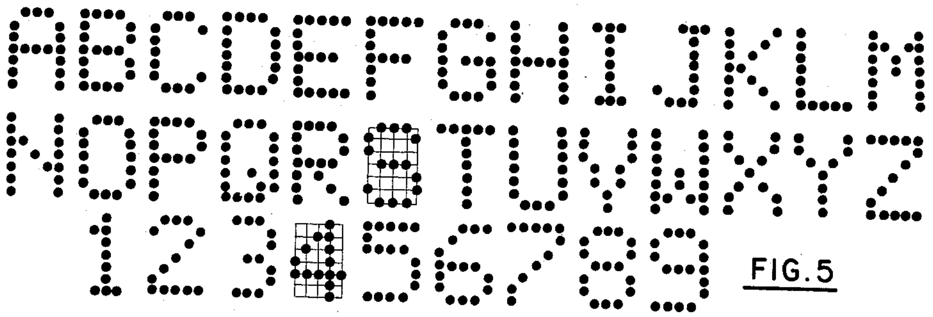
Figure 6:
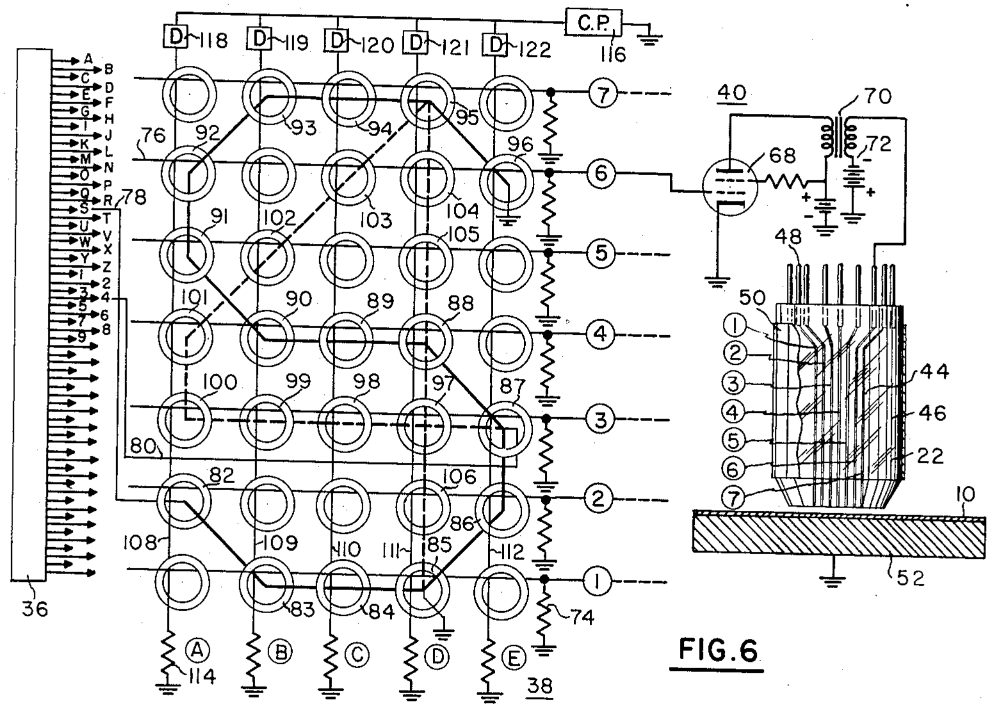
Figure 7:
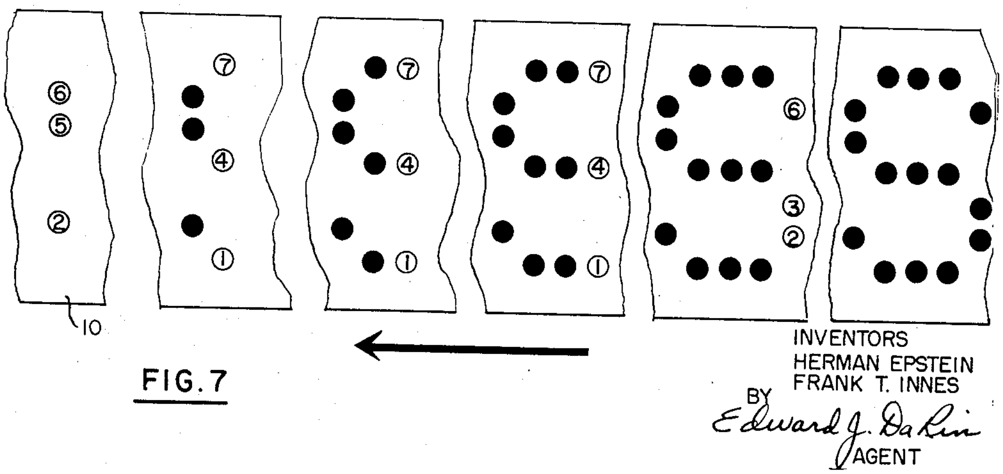
Figures 8, 8B, 8D:
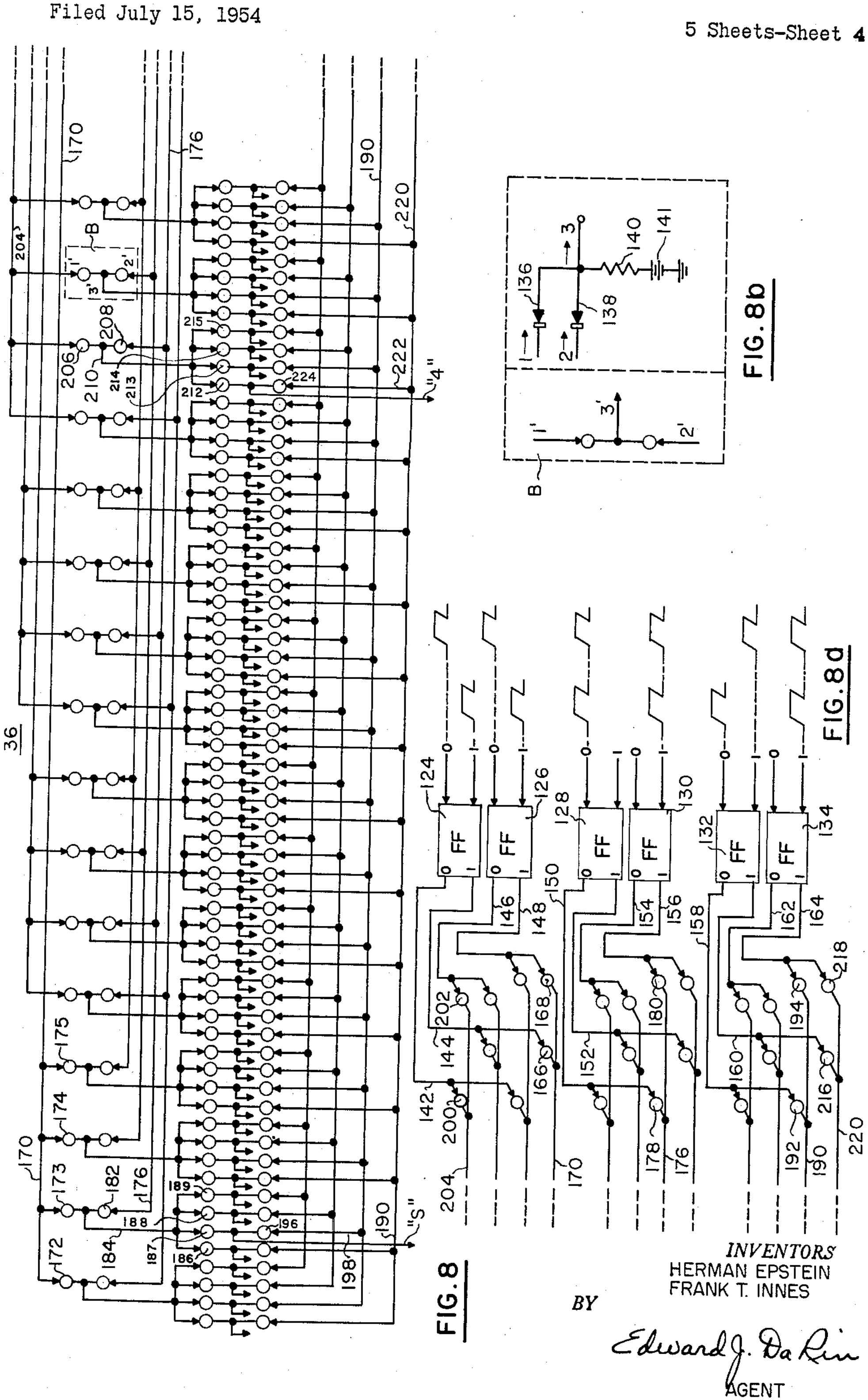
Figure 11:
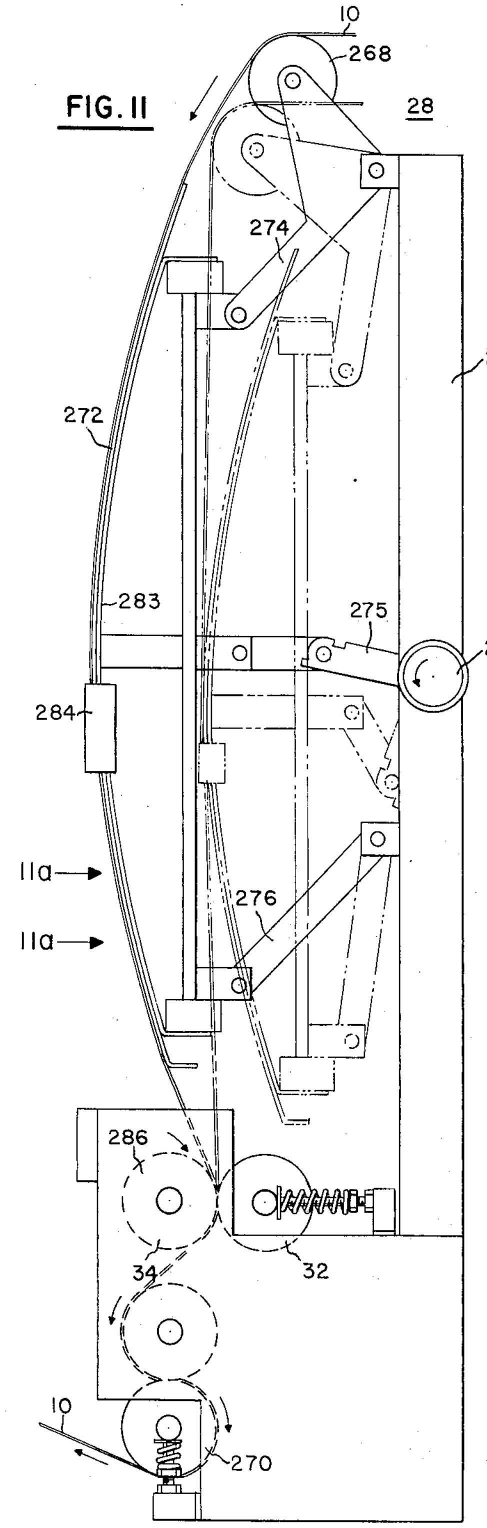
Figures 9, 10, 11A:
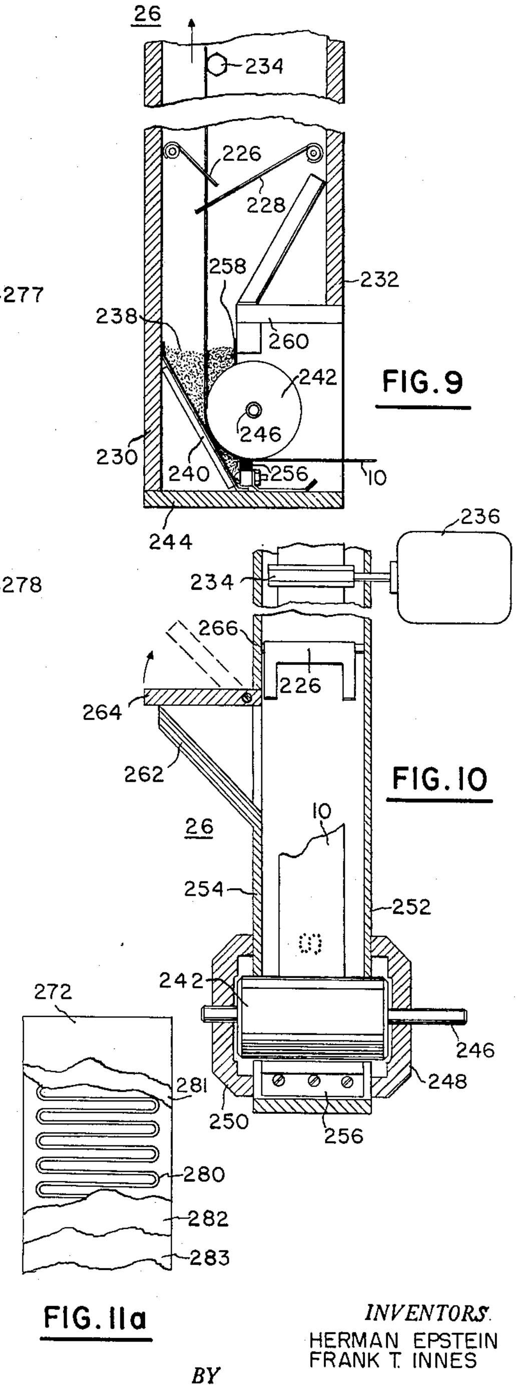

FIG. 4*a* is an enlarged view of another form of electrostatic latent image;

FIG. 5 is a chart of typical characters which may be selectively recorded illustrating their formation from a dot-sequence;

FIG. 6 is a diagrammatic view of a portion of the control circuit illustrated with the recording head positioned in a side elevation;

FIG. 7 is an enlarged diagrammatic representation illustrating the step-by-step formation of a typical character illustrated on fragments of the recording medium;

FIGS. 8 and 8*a* when combined are a diagrammatic representation of a decoding circuit utilized in the control circuit for the recording system;

FIG. 8*b* is a schematic representation of a typical network utilized throughout the circuit illustrated in FIG. 8;

FIG. 9 is a partial front elevation view of the inking chamber with the front cover removed to illustrate a typical inking method;

FIG. 10 is a partial side elevation view of the portions of the inking chamber illustrated in FIG. 9;

FIG. 11 is an enlarged front elevation view of the heat processing unit of the recording system; and FIG. 11*a* is a fragmentary cross-sectional view of the unit shown in FIG. 11 illustrating the heat transmitting plate and the heater.

*General description*

The general scheme of the invention will now be explained with reference to the illustration of FIG. 1.

The novel electrographic printing method will be described from the point of view of receiving information in the form of binary coded pulses from an electronic computer which has a serial output. The computer output in this instance may be received in terms of a six bit binary code in which each six bit group represents a single character. It may be readily appreciated that the input information may be received in any form depending upon the input device or storage medium employed and may be readily converted to be utilized with the novel electrographic printing method. As an example, the input information may be derived from a punched recording medium and converted into the proper electrical terms to be applied to the control circuit associated with the recording device. It is, therefore, apparent that the input information and the conversion thereof, when necessary, to electrical signals to be applied to the control circuit for the printer may take various forms as may be provided by those skilled in the art.

Broadly, the novel electrographic printing method may consist of two steps (1) recording the input information through the production of electrostatic latent images in the form of Lichtenberg figures and (2) rendering the electrostatic latent images visible and, if desired when using a dry powder, the third step of rendering the visible images permanent. In the embodiment illustrated in FIG. 1 the step of rendering the electrostatic latent image visible is performed in the separate steps of applying a homogeneous uncharged inking powder to the image and permanently fixing the ink to the recording medium by heat processing. The recording of the electrostatic latent images results from the establishment of a controlled print potential between a pair of electrodes having a dielectric medium of suitable resistivity spaced from and interposed between them. One of the electrodes may approach a point or pin electrode and the other electrode may be a plane, base, or plate electrode. The applied potential sets up an electrostatic field of force between the electrodes and having the lines of force passing through the dielectric medium. The applied potential has the further characteristic of causing a silent, invisible electrical discharge between the pin electrode and the surface of the dielectric material without causing a physical breakdown of the latter, thereby causing a discrete electrostatic latent image, or charged area, to be formed on the surface of the dielectric medium. The theory of the electrical discharge will be described more fully hereinafter in the section entitled "Recording."

It should be noted at this point, however, that the term "surface charge" or electrostatic latent image as used throughout the specification and appended claims is defined as the charge produced as a result of the electrical discharge described herein and not the free surface charge resulting from the rubbing of two dissimilar materials, for example.

The formation of the discrete electrostatic latent images may be utilized to reproduce any given input information into any predetermined intelligence pattern at very high speeds by controlling the sequencing of and/or number of electrical discharges. The high speeds attainable may be readily appreciated by noting that generally the movable elements in the printer are associated with the recording medium. The formation of the discrete electrostatic latent images is, therefore, readily adaptable to high speed matrix printing.

Figure 1:
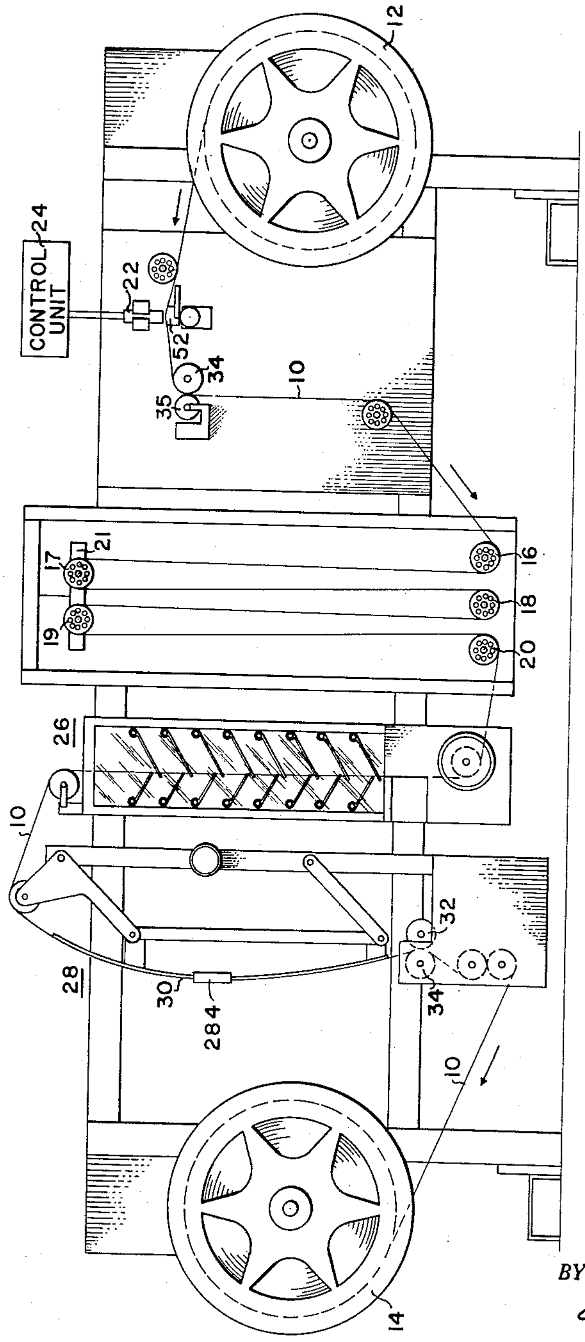
FIG. 1 is a front elevation view of the complete recording system with the control circuitry illustrated in block form.

The recording medium 10 is illustrated in FIG. 1 as travelling from the right hand end to the left hand end of the illustration. The recording medium 10 may be stored as in this instance on a storage reel 12 positioned to allow the recording medium 10 to unwind and pass therefrom to the receiving reel or take up reel 14 at the opposite end of the printing device by way of the various processing stations. The recording medium 10 is further arranged to be kept under constant tension during its continuous travel through the printing device. The group of rollers 16–20 are arranged to maintain constant tension on the recording medium 10 and is further arranged to correct for speed changes in the drive motors. The tensioning arrangement will be described more fully hereinafter. The recording medium 10 receives an electrostatic latent image at the recording station from the electrical discharge produced at the recording head 22. The electrical discharge is initiated by a controlled voltage pulse derived from the control unit 24. The control unit 24 is diagrammatically represented as a block connected to the recording head 22. The unit 24 and the phenomena of the electrical discharge will also be described more fully hereinafter. The recording medium 10 impressed with the electrostatic latent image is then driven through the inking station, generally identified by the reference character 26, wherein it is coated with a suitable ink which will cling strongly to the electrostatic latent image. The inked recording medium 10 is arranged to pass vertically upwards as illustrated in FIG. 1 between a series or group of baffle plates. The inked recording medium 10 is arranged to be rapidly vibrated as it passes through the series of baffle plates to shake off the excess inking powder clinging to the background or uncharged areas. Recording medium 10 is substantially electrically uncharged, or neutrally charged, as it comes off of storage reel 12.

The inked recording medium 10 is finally driven through the heat processing station, generally identified by the reference character 28, wherein the image is permanently secured to medium 10. The recording medium 10 is heat processed by means of the transfer of heat from a heated surface of a heat conducting metallic plate 30 and is thereby softened. The recording medium 10 then passes through the nip of calendering rolls 32 and 34, which serve to embed the powder in the softened medium. The rolls are shown in more detail in FIG. 11. The fixed recording medium 10 continues its travel to the receiving reel 14 wherein it may be temporarily stored for future use.

Although the description hereinabove relates to an automatic printing device, the processing involved in rendering the electrostatic image visible may be performed at a point later in time as desired. This is made possible due to the exceedingly long times of storage which a suitable recording medium affords. The processing steps of rendering the electrostatic image visible may be entirely omitted in applications wherein it is found desirable to utilize the recording medium as a temporary storage device. Furthermore, the final step of heat processing the image may be performed at a point later in time since the inked visible image will remain on the paper for long durations of time before fixing.

To further facilitate the description, the specification is divided into a number of designated parts. Portions of the printing device which do not have a designated part therefor are described in connection with the designated part deemed most pertinent.

*Recording*

Figure 2:
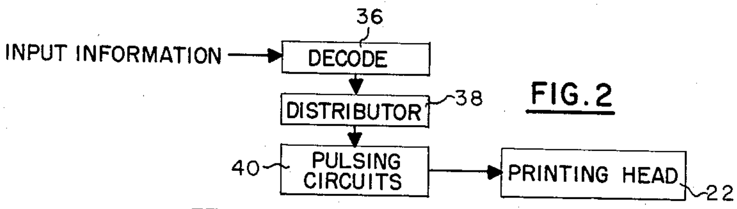
FIG. 2 is a block diagram of the units comprising the control circuit for the recording unit.

Referring now to FIG. 2, the elements comprising the control unit 24 to record the electrostatic latent image are diagrammatically represented. The input information may be delivered to a decoding or switching unit 36, which delivers the pulse to the one of its output lines corresponding uniquely to the character or symbol desired. The distributor circuit 38 receives the input pulses and delivers them to the desired printing styli or pin electrodes positioned in the recording or printing head 22. The output pulses from the distributor unit 38 are coupled to the printing styli by means of the pulsing circuits 40 which step up the pulses to the desired potential to produce the electrical discharge.

The illustration of FIG. 3 shows an enlarged view of the recording station of the novel printer positioned as illustrated in FIG. 1. The recording head 22 is shown secured in the printing position by a substantially clamplike plate 42 having an aperture mating with the outer surface of the recording head 22. The plate 42 is in turn secured to the frame of the printing device (not shown). The printing styli 44 of the recording head 22 are each electrically connected to separate output pins 48 as may be more readily seen by reference to the side elevation view of FIG. 6. Each output pin 48 is connected to receive an input stimulus from the pulsing circuits 40. The recording head 22 in this instance is provided with seven styli, similar to the ones identified by the reference character 44, arranged in a straight line, a matrix of one column which is perpendicular or crosswise to the direction of travel of the recording medium 10. The styli 44 are embedded in a high resistivity material 46 and fixed therein to maintain the correct resistance between same for proper recording. The spacing between the electrodes is determined by the resistance required to insure negligible conduction between same since such conduction will prevent the formation of the electrostatic latent images. It has been found that the minimum inter-electrode resistance is in the order of $1 \times 10^{13}$ ohms for proper recording. A material for embedding the styli that has been found to provide the correct resistive properties is a plastic casting compound comprising a Hysol #6080 and a hardener C–1 manufactured and distributed by Houghton Laboratories, Inc., Olean, New York. Such resistive material may be translucent and render the embedded styli slightly visible as shown in FIG. 3. Since spacing of the styli is governed by the inter-styli resistance, it determines one dimension of the printed characters which are built up by selective pulsing of the styli as the recording medium 10 is passed thereunder.

The terminal ends of the recording styli, or pin electrodes 44 are arranged flush with the printing end of the recording head 22. The printing end of the recording head 22 is preferably in the form of a frustrum of a cone protruding from the end of a metallic cylinder 50 which is positioned to surround the outer surface of the resistive material 46. The recording styli 44 may be formed of any electrical conducting material such as tungsten, steel or nickel.

Associated with the recording head 22 there is provided an electrically grounded plate, or base electrode 52. The grounded plate 52 is illustrated in FIG. 3 as provided with a curved surface adjacent the recording head 22. The curvature is provided merely as a convenient means of maintaining a fixed air gap between the recording head 22 and the recording medium 10. The grounded plate 52 is held by movable arm 54 which is pivotally mounted to the frame of the printing device. The arm 54 is arranged to position the plate 52 in either a printing position or a position retracted therefrom. The bottom surface of the plate 52 is arranged to engage a roller 56 which provides the means of positioning the plate 52 in its two positions. The roller 56 is eccentrically pivoted and is secured by the member 58 provided with a U-shaped opening to receive same. The member 58 is fixed to the frame of the printing device. Coupled to the roller 56 is a wheel 60 which controls the positioning of the roller. Rotation of the wheel 60 will position the roller 56 in its opposite extreme from that illustrated in FIGS. 1 and 3. The recording medium 10 is shown as it is received from the storage reel 12 by the roller 62 and is fed between the roller 64, the recording head 22 and the grounded plate 52 and the rollers 34 and 35 and past the roller 67. The recording medium 10 with the electrostatic latent image thereon is next delivered to the inking station wherein it is rendered visible, as will be more fully described hereinafter.

The size and shape of the electrostatic latent image formed on the recording medium 10 resulting from the electrical discharge from one of the printing styli 44 to the recording medium 10 depends on a combination of variables including the polarity of the applied voltage, the electric field strength and the characteristics of the recording medium used. The recorded electrostatic latent images may vary in their resulting configuration in accordance with the polarity of the applied potential of the adjacent electrode. It has been found that both positive and negative potentials applied to the printing styli produce small images or marks suitable for high speed recording. The images formed by a negative voltage are illustrated in FIG. 4 and an image formed by a positive voltage is illustrated in FIG. 4*a*. For purposes of facilitating the description, the theory of operation will be explained with reference to a negative potential applied to the recording styli and, therefore, the formation of a negative Lichtenberg figure. The charge pattern or latent Lichtenberg figures resulting are illustrated in FIG. 4 as they may be grouped to form the letter "S." The negative Lichtenberg image consists of a round area of negative charge surrounded by a ring-like area of positive charges. The negative electrostatic image results from the entrance of electrons into the surface layer of the dielectric recording medium. It appears that the stubbornness with which the charge sticks to the recording medium leads to the conclusion that it is not a free surface charge.

The formation of the image appears to result from the momentary lowering of the resistivity of the recording medium under the stress of the electrostatic field. The resistivity of the paper is lowered in the area where the electrons enter and further forms a positive zone around the negative area by forces of induction. The plate electrode 52 serves to set up the initial electrostatic field in the ambient gas leading to the electrical discharge. It has been found that the net charge density of the negative area is greater than the positive area. This charge density is controlled to cause the negative areas to be charged sufficiently to allow the ink to adhere only thereto in the final processing or inking. Similarly, the somewhat irregular formation illustrated in FIG. 4*a* is formed by the application of a positive potential to one of the pin electrodes and apparently results from a electron flow towards the central positive zone.

It has been found that there is a time lag between the application of the potential and the recording of the electrostatic image which varies with the applied potential and evidently also with the pulse rise time. The lag has been found to decrease with increases of voltage. This lag appears to be theoretically explained as follows: After the application of a negative potential a positive ion drifts into the region between the electrodes and strikes a printing stylus causing a secondary electron to be emitted therefrom. The secondary electron is strongly repelled by the negative stylus and proceeds outward at very high speeds ionizing the gas by a collision process which creates an electron avalanche. The resulting excess of electrons at the dielectric surface causes radial avalanche thereon. Since the mean energy of the electrons is a constant, the length of the radial avalanches are constant whereby a round dot applicable to the method of electrographic printing results. During the period of the electrons are moving away from the the recording stylus they form a relatively immobile space charge cloud of positive ions behind it. This space charge cloud tends to extinguish the discharge. For purposes of explaining the nature of the discharge, assume the applied discharge potential is not removed after the silent discharge occurs and the recording medium is charged, it has been found that under these conditions the discharge will not repeat as long as the recording medium remains in its initial position. This appears to be best explained by the fact that the electrons deposited on the dielectric surface of the recording medium reduce the field strength below the field strength required to produce a succeeding electrical discharge. Another electrical discharge from an electrode will occur, however, if the charged area of the recording medium is advanced beyond the influence of the electrostatic field. Therefore, it may be readily appreciated that the voltage pulse applied to the electrodes must be proportioned with respect to its time duration to cause an electrical discharge at only the precise instance of time to correspond with the speed of the recording medium. The printing pulse required is readily adaptable to pulse operation and the pulse waveform appears to have little effect on the printing until the applied pulses have a time duration in the neighborhood of 40 microseconds.

A further characteristic of the discrete electrostatic latent images is that the positive and negative charged areas are of different strengths as hereinabove mentioned. The negative area, in the case of the negative images, has a much greater net charge density than the positive area. This fact is of value in the inking stage since the uncharged ink will tend to adhere to the entire electrostatic latent image as will be apparent from the description of that stage of the novel printing method.

The amplitude of the applied voltage is necessarily governed by the spacing of the electrodes and the electrical characteristics of the recording medium. However, relatively large changes in voltage, with respect to the lower limits of voltage leading to an electrical discharge, control the size of the electrostatic latent image formed. The effect of variations in applied voltage or field strength for a given spacing and recording medium has been found to have no visible effect on the printing for relatively small variations in the voltage. These field strength variations may be largely eliminated through the proper choice of voltage. For a desired image size this may be realized by utilizing a substantially higher voltage in combination with a relatively thick layer of dielectric material between the recording medium and the grounded electrode along with the dielectric coating facing the printing styli. The advantages of this combination include the allowance of increased electrode spacing and less duration of the printing pulse for pulse operation along with the increased mechanical tolerances.

It has been found that dots of 0.2 mm. diameter have resulted from the application of 1200 volts to the electrodes. The printing stylus in this instance was a flatface nickel wire, 5 mils in diameter. The recording medium comprised a 0.5 mil polyethylene film on a 3 mil paper substrate, directly above the plate electrode, spaced at a distance of 2 mils from the printing electrodes. Characters have been produced from these dots ranging from at least dick strip size of .140" and smaller. The linear recording of characters at approximately 1500 characters per second has been demonstrated by an embodiment of the invention. The limitation to the attainment of higher speeds has been the paper feed mechanism. The recording of characters at speeds exceeding 5000 characters per second is potentially possible by this method with improved paper feed and drive mechanisms. Marks may be placed on the recording medium in durations as small as one micro-second.

It also has been found that improved printing or recording will result under a given set of conditions by providing substantially constant unidirectional bias potential between the printing and the base electrode and then increasing the potential between the desired styli to the printing voltage by a voltage pulse. This biased operation has resulted in more uniform image size. The obvious advantage of employing the bias is the decrease in pulse amplitude required. It necessarily follows that decreased amplification is required of the pulsing circuits 40 and simplifies the circuitry therein. A pulsing circuit that has been successfully used with a biasing source is illustrated in FIG. 6. The required amplification for printing is obtained from the combination of the amplifier 68 and pulse transformer 70. The battery 72 is representative of the bias voltage for the printing stylus 44 and is connected between the pulse transformer 70 and ground. The selection of bias voltage must be considered with the view that it will not result in erroneous results. Specifically, the bias voltage must not be of sufficient amplitude of itself to cause any undesirable electrical discharge in the form of a corona, glow discharges and the like which may form charged areas or images on the recording medium. A further factor to be considered in the selection of a bias voltage is that during the intervals when the recording medium is not positioned between the electrode structure the voltage should be of such an amplitude to prevent arcing between the pin electrodes and the grounded plate 52. This may occur, for example, upon the replenishing of the supply of recording material. Also the applied voltage pulses alone must not be of sufficient amplitude to cause undesired images to be produced. Therefore, it is desirable that only the combination of the bias plus the applied print voltage pulse cause the electrical discharge leading to the latent image. In addition to allowing the use of a smaller amplitude printing pulse, the use of biased electrodes allows the closer spacing of the recording styli since the potential between adjacent pin electrodes is reduced by the amount of the bias without changing the total printing voltage required. Under the aforementioned conditions of printing with 1200 volts, a bias voltage in the neighborhood of 600 volts has resulted in reliable printing.

The recording medium utilized with the novel printing method must have at least the basic requirement of a surface resistivity in the order of $10^{13}$ ohms or more and of relatively high uniformity for proper recording thereon. The resistivity of the recording medium or paper determines in part the storage time of the charge. Where it is desired to heat process the recording medium for permanent development of the electrostatic images the recording medium should have thermal characteristics of such a nature to combine with a suitable ink. Many materials are readily available which have the aforementioned requirements and the choice of any one of them may be controlled by economic factors. Materials that have proven successful in addition to the aforementioned polyethylene coated paper are papers coated with a modified ethyl cellulose, polystyrene and acrylic resins among a larger group of resins. In addition to dielectric coated papers, dielectric papers of suitable resistivity may be used in combination with thermoplastic inking powders. Also, the recording medium should not introduce extraneous triboelectric charge problems.

The recording medium is driven from right to left in FIG. 1, as hereinabove mentioned. The recording medium 10 in this instance is driven by separate motors (not shown) at the rollers 34 and 35 as illustrated in FIG. 1. The motors are arranged to be driven at substantially the same speed in order to maintain a constant tension on the recording medium. In this instance the control is accomplished by the sensing of the tensioning through the series of rollers 16–20. The bottom rollers 16, 18 and 20 are fixed to the frame of the machine while the rollers 17 and 19 are arranged on a movable yoke 21. Any difference in speed between the two drive motors will be signalled by a change in tension of the recording medium at some point intermediate between the drive points. Therefore, this change in tension is sensed by the movement of the yoke 21. The specific method and apparatus for controlling the tension is the subject of another patent application by Robert R. Tarbuck entitled "Tape Feeding System," Serial Number 447,990, filed August 5, 1954, now Patent No. 2,869,674. The yoke 21 has a variable resistance unit (not shown) associated with same which is coupled to control the speed of the motor associated with one of the drive positions (roller 34 for instance). The change in the resistance unit, therefore, signals for a change in speed of the drive motor. It necessarily follows that to prevent breakage of the recording medium that the speed of the motor at position of the roller 34 must never exceed the speed of the motor drive at the roller 35 (assuming same diameter rollers).

*Control circuit*

Referring now more specifically to FIGS. 6 and 7, the method of distributing the pulses to develop the letters and numbers of FIG. 5 will be explained more fully. The input pulses to the pulse distributor circuit 38 are received from the decoding or switching circuit 36 which is diagrammatically represented in FIG. 6. The decoding circuit 36 provides a single output pulse for each character to be recorded. The chart of FIG. 5 is representative of the letters and numerals which may be selectively recorded on a recording medium. The chart represents the development of the characters based on a 5 x 7 matrix in a controlled sequence of dots or images. The development of the characters occurs in a maximum of five steps and they develop sequentially from left to right as illustrated in FIG. 7, assuming the travel of the recording medium in the opposite direction.

The pulse distributor circuit 38 is illustrated in this instance in a matrix arrangement of similar static magnetic cores each characterized by having a rectangular hysteresis loop. Static magnetic cores of this characteristic are well-known in the art as evidenced by the article of An Wang published in the June 1950 issue of the Proceedings of the I.R.E., pages 626–629, entitled "Magnetic Triggers" and references cited therein. It may be readily appreciated by those skilled in the art that the distribution of the pulses may employ other temporary or permanent storage devices such as magnetic drums, flip-flops ferroelectric devices and the like without departing from the spirit of the invention.

The structural arrangement of the magnetic cores of the pulse distributor circuit 38 will now be described. The magnetic cores are arranged in a 5 x 7 array of rows and columns. Each magnetic core may be said to be positioned at the point of intersection of a row and column. The five columns are identified by the letters A–E inclusive reading from left to right in FIG. 6. Similarly, the rows are identified by the encircled reference characters 1 through 7 reading from the bottom to the top as illustrated. The magnetic cores are of the aforementioned square loop hysteresis characteristic and each magnetic core is provided with at least one input circuit, a read-out circuit and an output circuit. The magnetic core matrix is arranged with a common output winding for each row of magnetic cores. Each output winding is further associated with a separate recording stylus and grounded through an appropriate resistor 74. As an example, the output winding identified by the reference character 76 is interwoven through the row of cores, with the appropriate number of turns per core, identified by the encircled reference numeral 6. The output winding 76 is connected to the recording stylus at position "6," reading from left to right as illustrated, through the pulsing circuit 40. The pulsing circuit 40 is operative in combination with the bias supply 72 to build up the relatively low level signal obtained from the output winding 76 to the required printing voltage by means of the amplifier 68 and the pulse transformer 70. Similarly, each of the remaining output windings is associated with a recording stylus corresponding in position to the encircle reference numeral associated therewith.

The distributor circuit 38 may be provided with thirty-five individual inputs to record the letters and numerals illustrated in FIG. 5. However, it may be readily appreciated that any remaining inputs provided may be utilized to record regular characters such as punctuation, arithmetic symbols or any special characters desired in the same general manner. To clarify the illustration and simplify the explanation, the magnetic core distributor 38 is shown with only the input windings 78 and 80 interwoven through the group of magnetic cores to form the characters "S" and "4" respectively. Following the input winding 78 from the "S" output terminal of the decoding unit 36 it may be seen that it is first coupled to the magnetic core 82 located at the intersection of column A, and row 2. From the magnetic core 82 the winding 78 is interwoven through the cores 83, 84 and 85 of row 1. The winding is then passed through the cores 86 and 87 of Column E and then successively through the cores 88, 89 and 90 in row 4. From the magnetic core 90 the winding 78 is passed vertically upwards through the cores 91 and 92 of column A. The winding is then successively interwoven through the magnetic cores 93, 94 and 95 of row 7 and finally passed to the core 96 and then the end terminal of the winding is grounded. It may be readily appreciated that the circuitous path of the input winding 79 through the magnetic cores results in physically forming the letter "S" thereby.

Similarly the numeral "4" may be physically formed by the input winding 80 in its circuitous path from the "4" terminal of the decoding circuit 36 through the distributor circuit 38. The input winding is initially coupled to the magnetic core 87 positioned at the intersection of the coordinates, column E and row 3 and is horizontally passed through the remaining magnetic cores of row 3, namely the cores 97, 98, 99 and 100. The winding is passed from the core 100, to the cores 101, 102, 103 and 95, positioned at the intersection of column D and row 7, from which core it is passed vertically down through all the remaining cores of column D, cores 104, 105, 88, 97, 106 and 85 to ground respectively. Now referring back to FIG. 5 wherein the characters "S" and "4" are plotted on a 5 x 7 matrix, it may be readily seen that the location of the dots corresponds to the position of the cores in the matrix distributor 38 and which illustrates the number of cores required to form the desired characters. Accordingly, the formation of the remaining characters may be appreciated by the superimposition of the desired ones from the illustration of FIG. 5 upon the magnetic core matrix arrangement as a guide in interweaving the input windings through same.

Upon the energization of any one input winding all the magnetic cores coupled to it are set in the same storage state. The remaining problem is to read out the group of pulses forming the desired characters. The reading out is accomplished by providing an individual read out winding for each column and coupled to each of the cores, with the appropriate number of turns on each, of each column. The read out windings for the columns A–E are identified by the reference characters 108 through 112 respectively. One terminal of each of the read out windings is connected to ground by means of an appropriate resistor substantially similar to the resistor identified by the reference character 114 associated with the read out winding 108. The opposite terminals of the read out windings are each connected to a separate delay element, providing a different delay, to a source of read out timed pulses or the clock pulse source 116. Practically it would be desirable to provide an amplifier with each delay element to build up the clock pulses to a sufficient value to allow the magnetic cores to switch storage states. The common read-out winding for each column allows all the cores associated with the respective column to be read out substantially simultaneously. The columns are read out sequentially from left to right, columns A–E. Therefore, it is apparent that since the same clock pulse is utilized to read out all the cores, the delay elements 118 through 122 are proportioned to provide an increasing order of delay to allow the previous column to be read out. The interval between successive deliveries of clock pulses is arranged to correspond with the successive delivery of input pulses to the distributor 38 from the decoding circuit 36. The delivery of the clock pulses is further controlled or governed by the speed of the recording medium. Upon the successive delivery of read out pulses to each column, the cores of that particular column which were switched by the input pulse coupled thereto is switched back to its previous state by the read out pulse. In switching the state the change in flux is of sufficient amplitude to generate an output pulse in the common output winding of the row with which the particular magnetic core is associated. In reading out the cores of column A to record the letter "S," cores 82, 91 and 92 are switched and an output pulse is thereby provided for the associated recording styli 2, 5 and 6. Similarly, in reading out column B, cores 83, 90 and 93 are switched and pulses are provided at the recording styli 1, 4 and 7. The development of the letter "S" in this manner may be readily seen by referring to the step-by-step development of same illustrated in FIG. 7. The illustration of FIG. 7 shows an enlarged plan view of fragments of the recording medium 10 which corresponds to the steps of developing the character. Each step is illustrated to show the recording styli which are energized during that particular step and they are so identified by their numerals indicating their respective positions in a circle, while the dots formed by the previous step or steps are illustrated by a solid dot. The first fragment of recording medium illustrates that the recording styli 2, 5 and 6 are energized, while the second fragment shows the images formed thereby in solid and the styli 1, 4 and 7 being energized. Similarly, the styli 1, 4 and 7 are energized in the next two steps and the styli 2, 3 and 6 on the last step. The last fragment of the recording medium 10 shows the complete character, in this instance "S," as developed by the previous five steps. The development of the numeral "4" and any other desired character may be similarly formed.

Referring now to FIGS. 8–8*b*, the operation of the diagrammatic representation of the decoding unit 36 therein illustrated will be described. For convenience in illustrating, the schematic diagram has been divided into two portions. The portion illustrated as FIG. 8*b* is connected to the illustration of FIG. 8 at the right hand end as illustrated. The decoding unit comprises the combination of the diode rectifier gating networks substantially as illustrated in FIG. 8*b*. The general scheme of diode rectifier circuits used in high speed switching or decoding circuits is described in the publications from the Annals of the Computation Laboratory of Harvard University, vol. XXVII entitled "Synthesis of Electronic Computing and Control Circuits," by the Staff of the Computation Laboratory published in 1951, pages 126 et seq. The decoding unit may consist of a rectifier matrix arrangement having any number of output lines up to $2^n$ where $n$ is the number of associated two-wire input channels comprising rectifier submatrices. The decoding unit illustrated in FIGS. 8 and 8*a* provides sixty-four individual outputs from an input developed from a six bit binary code whereby only one output line is rendered effective for any one combination of the six bits. The arrangement illustrated employs the minimum number of rectifiers for achieving the desired result.

FIG. 8*b* illustrates the basic diode gating arrangement and the equivalent diagrammatic representation of same utilized in the schematic of FIGS. 8 and 8*a*. The use of the diagrammatic representation is resorted to since it greatly simplifies the illustration and explanation of the decoder. The basic arrangement comprises the diodes 136 and 138 arranged in parallel and in the same direction of conductivity. In this instance the forward terminals of the rectifiers are connected to the output lead identified as 3. The cathode of each diode is connected to the lead 3 along with a biasing resistor 140 and the biasing source 141. The biasing resistor 140 is proportioned to provide an output at the lead 3 only when there is a simultaneous occurrence of inputs of the same polarity and amplitude at both the terminals 1 and 2. Similarly, the equivalent diagrammatic arrangement is illustrated to the left of the schematic illustration with the same input terminals identified as 1 and 2 and the output at 3. The diagrammatic representation is identified by the reference letter "B" and a typical application of same is blocked out in the schematic of FIG. 8 wherein it is similarly identified.

The input channels to the decoding unit are controlled by a group of two position switching devices, in this instance flip-flops. The flip-flops are identified by the reference characters 124, 126, 128, etc. The two outputs of each of the flip-flops are conveniently identified as "zero" and "one" to facilitate the description. Each of the flip-flop outputs is connected to one of the input channels of the decoding unit 36. The input channels associated with the flip-flop 124 are identified by the reference characters 142 and 144. The input channel 142 is connected to the "zero" output of the flip-flop 124 and the channel 144 to the "one" output. Similarly the channels 146 and 148 are associated with the "zero" and "one" outputs of the flip-flop 126, the channels 150 and 152 with the flip-flop 128 and the "zero" output of the flip-flop 130 connected to the channel 154 and the remaining output to channel 156. The flip-flops 132 and 134 are similarly arranged with the channels 158 and 160, and 162 and 164, respectively.

The detailed operation of the decoding unit 36 may be readily appreciated upon the carrying out of the decoding operation to select a character to be recorded on the recording medium. Assuming the code groups for the characters "S" and "4" are delivered to the circuit and are to be selected to be distributed to the recording head to record same as hereinabove described. The letter "S" may be represented in a six bit binary code as 110101 and the numeral "4" as 000111. First, the decoding of the letter "S" proceeds from the application of the coded representation of the letter to the corresponding inputs of the flip-flops 124—134, from top to bottom, as illustrated in FIG. 8*a*, to agree with the reading of the code group from left to right. The energizing of the "one" input of the flip-flop 124 will result in the application of the desired potential to the input channel 144. Similarly, the "one" output of the flip-flop 126 results in the application of the same desired potential to the input channel 148. Following the channel 144 through the gate 166 and the channel 148 through the gate 168, it may be seen that as a result of this gating action the lead wire 170 is selected. The lead wire 170 couples the output to the inputs of the four gating networks identified as 172, 173, 174 and 175 located in the upper left hand portion of the figure. Following through the next pair of inputs, "0" and "1" to the flip-flops 128 and 130 respectively, it may be readily seen that the input channels 150 and 156 are selected. The stimuli applied to these channels result in the selection of the lead wire 176 by means of the gating networks 178 and 180. The lead wire 176 is coupled to the gating element 182 which coacts with the gating element 173, the latter being conditioned by the lead 170 as hereinabove described. Therefore, since the appropriate potential is applied to these elements, 173 and 182, an output will appear on the lead wire 184. The lead wire 184 is coupled to the group of gating elements 186, 187, 188 and 189. Now to complete the decoding, the tracing of the last pair of coded inputs, "0" and "1" is necessary. The flip-flops 132 and 134, upon the application of the latter pair selects the channels 158 and 164 respectively. The selection of the channels 158 and 164 further determines the selection of the lead wire 190 by means of the gating elements 192 and 194. The stimulus appearing on the lead wire 190 is then coupled to the gating element 196 by means of the lead wire 198. It may be readily appreciated that the gating element 196 cooperates with the similar gating element 187. The gating element 187 was previously conditioned as a result of the multiple gating action associated with the first four binary representations. Accordingly, the conditioning of the gates 187 and 196 results in an appropriate output pulse on the lead wire identified as "S."

Similarly, the numeral "4" and its corresponding code group 000111 may be followed through to the selection of the lead wire identified as "4," located at the right hand extremity of the illustration. The energization of the "zero" inputs of the flip-flops 124 and 126 results in the selection of the input channels 142 and 146 respectively. Accordingly, the conditioning of the gating elements 200 and 202 results in the selection of the lead wire 204. Since the second pair of binary bits are identified as employed in the representation of the letter "S," the lead wire 176 is again selected. Therefore, as a result of the selection of the lead wires 176 and 204, the corresponding gating elements 206 and 208 are conditioned. The latter combination results in the energization of the lead wire 210. The lead wire 210 conditions the group of gating elements identified by the reference characters 212, 213, 214 and 215. The application of the last pair of bits, "1" "1," results in the selection of input channels 160 and 164. By means of the gating elements 216 and 218 the lead wire 220 is selected. Accordingly the lead wire 220 energizes the lead wire 222, the input lead wire to the gating element 224. The simulanteous energization of the gates 212 and 224 results in the energization of the lead wire identified as "4."

It is, therefore, readily apparent that any one of the remaining sixty-two outputs may be selected to represent a different character or symbol in accordance with any unique permutation of the six bit binary code. It is readily apparent that the six bit binary code maay be derived directly from the output of an electronic computer or indirectly from a punched card or tape in combination with the appropriate converters for said devices. It is further apparent that in applications wherein a four bit binary code is desired for only thirty-two outputs, the circuit may be simplified by omitting a pair of flip-flops, the flip-flops 132 and 134 for example, and all the gating elements associated therewith. In this instance the leads similar to the output lead 184 would represent the output leads from the decoding unit. Further, due to the low level of voltages employed in the decoding unit it is found that a power amplifier tube is required between the individual outputs of the decoding unit 36 and the input leads of the distributor 38.

*Inking*

Referring now to FIGS. 9 and 10, the apparatus utilized in the inking station 26 of FIG. 1 will be more fully described. The illustration of FIG. 9 shows the bottom portion of the inking station 26 with the front cover removed and a fragmentary section of the inking station to illustrate the means of removing the excess inking powder. The illustration of FIG. 10 is a side elevation view of the portions of the inking station illustrated in FIG. 9. The recording medium 10 enters the ink container from the bottom right hand portion of the inking station 26 as illustrated in FIG. 9 and proceeds vertically upward through the plurality of baffle plates similar to the plates identified by the reference characters 226 and 228. The slotted shape of the plates may be readily seen from the illustration of the plate 226 in FIG. 10. The plates are slotted to allow for the passage of the recording medium therebetween. The plates are hinged to the side frames 230 and 232 of the inking station 26. As the inked recording medium passes up through the series of baffle plates 226, etc., the recording medium is shaken by a vibrating member 234 positioned adjacent the recording member. The vibrating member 234 in this instance may be in the form of a rod of hexagonal cross section driven by a small motor 236 (i.e. 3600 r.p.m.) as may be readily seen by reference to FIG. 10. This shaking of the recording medium provides a means for removing excess inking powder to remove the background discoloration.

The ink utilized in this particular embodiment is a homogeneous, dry, uncharged powder which may be of any color that will contrast with the recording medium to render the electrostatic images visible. The specifications of the ink will be described more fully hereinafter. The inking powder 238 is enclosed in a chamber formed by the plate 240 and the roller 242. The plate 240 is positioned at an angle between the side frame 230 and the bottom plate 244. The plate 240 is slightly displaced from a tangent near the bottom portion of the roller 242. The roller 242 is positioned up from the bottom wall 244 so as to receive the recording medium at the tangential bottom surface thereof. The roller 242 is held in position by the shaft 246 and the bearing plates 248 and 250, as may be readily seen in FIG. 10. The bearing plates 248 and 250 are generally C-shaped and are adapted to receive the shaft 246 and provide a bearing surface for same. The plates 248 and 250 are secured to the front and back walls 252 and 254 respectively of the inking station. The front wall 254 along with the bearing plate 250 are shown removed in the illustration of FIG. 9. Positioned between the bottom surface of the roller 242 and the top surface of the bottom wall 244, there is provided a means for retaining the inking powder 238 within the chamber. The brush 256 secured to the bottom wall 244 and in contact with the roller 242 serves this purpose in this instance. There is also provided a felt pad 258 in contact with the top portion of the roller 242 to further restrain the powder 238 within its chamber. The felt pad 258 is secured to the right hand wall 232 by means of the L-shaped plate 260 positioned at substantially right angles to the wall 232. The front wall 254 is provided with a funnel shaped aperture provided by the angular positioning of the plate 262 as a means for replenishing the inking powder 238. The entrance formed thereby is closed by a flat cover 264 which is hinged to a side wall plate 266 for opening movement. The latter plate acts as a continuance of the front wall of the inking station and restrains any cloud of inking powder formed as a result of the vigorous shaking by the member 234 from entering the atmosphere. This is also a function of the series of overlapping baffle plates 226, 228, etc.

It should be noted that there is no provision in the structural arrangement illustrated in FIGS. 9 and 10 for a means of charging the inking powder 238. Also the recording medium 10 is passed through the powder 238 in intimate contact with same. This implies that the induction forces must be sufficient to withstand the vigorous shaking at least on the electrostatic latent images. Referring back to FIG. 4 wherein the letter "S" is formed from the latent images, it is seen that each image is made up from a negative and a positive area. It may, therefore, be readily appreciated that the powder will cling to both these charged areas upon coming into contact with same. It has been found, in the case of the negative Lichtenberg formation, that with vigorous shaking, substantially all of the powder clinging to the positively charged areas as well as the uncharged background is removed. Therefore, through the use of an inking powder possessed of or adapted to have the correct mechanical and electrical properties the latent images may be rendered visible in the form of small circular dots with a minimum of background discoloration.

It may be appreciated from the above that the characteristics of the inking powder both mechanical and electrical, have been found to be important in rendering the electrostatic latent images visible. The obvious requirements of any inking powder used are that it be of a color of sufficient contrast from the recording medium to be easily readable and that it produces little or no background discoloration. The inking powder must also have the correct triboelectric relationship with respect to the recording medium. Specifically, the inking powder should receive little or no charge with respect to the recording medium due to the rapid motion of the medium passing through the ink. An ink which charged up in this manner would tend to cling indiscriminately to the background areas.

The mechanical properties of a suitable ink include the correct particle size to correctly combine with the recording medium of a given smoothness. If the size of the ink particles are too small they may indiscriminately adhere to the "hills and valleys" of the recording medium. While a too large particle size may result in not enough powder adhering to the charged areas, it has been found that the best particle size for an ink lies between 10 and 40 microns. The inking powder must also operate satisfactorily under differing conditions of relative humidity and temperature to maintain the proper particle size distribution. With a given size inking particle the electrical properties should include a high conductivity to cause it to cling to the electrostatic images by means of inductive attraction.

An example of an inking powder that has proven successful is the commercially available lycopodium powder. The lycopodium powder may be dyed black and prepared so that its bulk volume resistivity is in the neighborhood of $10^6$ ohm-centimeters. In applications wherein the inked images are rendered permanently visible through heat processing, the lycopodium powder may be further modified to provide it with the correct thermoplastic properties to combine with the recording medium. The lycopodium powder may be treated with a fine thermoplastic powder which merely acts as a binder. This implies that the desired thermoplastic powder must have the correct triboelectric relationship with respect to the lycopodium to prevent it from assuming a charge which would cause it to adhere to the latent image. A thermoplastic powder that has proven successful is gum ester C, manufactured by the U.S. Industrial Chemicals Co., 120 Broadway, New York, N.Y. Although lycopodium powder has been used as an example, it should be understood that other powders meeting the aforementioned specifications may be used to render the latent images visible. The use of both soft and hard magnetic inking powders has also proven successful and has the added advantage of enabling high speed magnetic sensing, or detecting, of the images.

*Fixing*

After the application of the inking powder to the recording medium and removal of the excess powder, the recording medium 10 is driven to the fixing station 28 where the powder is heat treated to render it permanently visible. Referring to FIG. 11 the recording medium 10 is illustrated as passing from the roller 268 positioned at the topmost portion of the fixing station, and is pulled down through the bottommost roller 270 from where it is driven to the receiving reel 14. The fixing station is illustrated with the heated plate 272 in a printing position. The plate 272 is illustrated as being bowed and held in operating position for heat processing by the series of levers 274, 275 and 276 pivoted to the supporting member 277 and controlled by the handle 278. Upon positioning the handle 278 in its opposite extreme by a counter-clockwise turn the hinged levers 274, etc. cause the plate 272 to assume the position illustrated in dotted outline. The retracted or non-printing position of the plate 272 has been arranged so that it is a sufficient distance from the recording medium 10 to prevent excessive heating of the medium when the machine is not printing.

The plate 272 is heated by a thermal element 280 constructed of a flat ribbon of Nichrome wire positioned on the inside of the plate and sandwiched between a pair of insulators 281 and 282, as may be seen in the detailed sectional view of FIG. 11*a*. The insulator 281 may consist of a thin sheet of mica while the insulator 282 may consist of a thick sheet of asbestos. A back plate 283 provides a means for securing the plate 272 to the frame of the machine. The insulator sheet 282 may abut the back plate 283. The temperature of the plate 272 may be controlled within limits by a thermostat 284 positioned approximately midway on same and attached to the front of same with clearance for the tape. The thermostat 284 is arranged to control the temperature of the plate 272 within limits so as not to char or burn the recording medium 10, but yet sufficient to soften the surface of the recording medium at the desired printing speed as it passes over the bowed surface of the plate. As the recording medium 10 passes from the heated plate 272, it is squeezed between the pair of calendering rollers 32 and 34. These rollers are adjusted to cause the inking powder to be embedded in the softened recording medium to afix it permanently in the surface of the recording medium.

Other techniques may be employed in rendering the latent image permanently visible such as by spray techniques. The inked recording medium may be sprayed with acrylic or like transparent liquid binders. Alternatively the images may be rendered permanently visible through wet inking techniques through the use of charged particles.

It is therefore apparent from the above detailed description that an economical high speed recording device is provided for marking a recording medium. The device records electrical information through the distribution of same to a control unit which distributes pulses to a novel recording head in a predetermined sequence. The recording head is associated with a rapidly advancing recording medium characterized by dielectric and thermoplastic properties to receive and retain on the surface of same electrostatic latent images, exhibiting the characteristics of a Lichtenberg figure formation, produced by electrical discharges initiated by the pulses distributed to the head. The electrical discharges are typed by electron avalances which are controlled to form the electrostatic latent images with a central zone of substantially high charge surrounded by a relatively weaker charge of opposite polarity. The thus charged recording medium may be passed through an uncharged inking medium to cause it to adhere to the electrostatic latent image thereby forming a visible powder image. The relative strengths of the charged zones enable the recording medium to be subjected to vigorous vibration to allow only the central zones to remain visible. The retention of the thus formed visible images results from heat softening the surface of the thermoplastic recording medium and pressing the powder into the surface.

Having, therefore, described detailed embodiments of the invention setting forth its organization and its mode of operation, it will be understood that various omissions and substitutions and changes in the form and details of the circuits illustrated and in their operation may be readily made by those skilled in the art within the scope of the invention. Therefore, those features believed descriptive of the nature of the invention are defined in particularity in the appended claims.

What is claimed is:

1. In a machine for recording intelligence received as electrical signals, the combination of at least a single pair of conductive members spaced a predetermined distance from one another, a recording medium having a surface characterized by being both dielectric and thermoplastic, means for advancing the recording medium between the conductive members and in spaced relation to one of the conductive members, a pulse distributor circuit to receive electrical signals and deliver same in a pre-set sequence, means to receive the electrical signals from the pulse distributor and couple them across the conductive members to produce an electrical discharge as each electrical signal is received between said conducting member and the recording medium to charge the dielectric surface of the latter with separated areas of electrostatic latent images, a chamber containing an inking powder of color contrasting with that of the dielectric surface of the recording medium, means for advancing the recording medium thus charged through the inking powder, means to rapidly vibrate the recording medium to remove the excess inking powder adhering to recording medium while maintaining same on at least a portion of the latent images, means for heat treating the recording medium to soften the charged dielectric surface of the same, and means to press the inking powder into the softened dielectric surface of the recording medium to permanently afix the powder to the surface of the recording medium.

2. Apparatus for electrically recording symbols comprising, in combination, a plurality of pin electrodes arranged in a row, an insulative housing for the pin electrodes maintaining a predetermined resistance between each of said electrodes, said housing further maintaining one end of the pin electrodes flush with one face of the housing, an electrode common to said pin electrodes and spaced slightly away therefrom, means for establishing a bias voltage between each of the pin electrodes and the common electrode, a dielectric recording member, the dielectric recording member further characterized by thermal sensitive properties, means for advancing the recording member between the common electrode and the pin electrodes and spaced from the latter, circuit means associated with each the pin electrode and the common electrode for delivering electrical stimuli to same, the electrical stimuli effective to cause an electrical discharge between each pin electrode and the record member thereby forming discrete electrostatic latent images on the latter, control means for causing said circuit means to deliver electrical stimuli in synchronism with the advancement of the recording member so that said images form symbols, and inking powder having thermal characteristics, means for subjecting the recording member to the inking powder, means for removing the excess inking powder from the recording member while maintaining same on a desired portion of said images, means for heat treating the recording member bearing the remaining powder image to soften same, and means for pressing the inking powder into the softened recording member.

3. In a system for electrically recording intelligence in a dot sequence, the combination, comprising a rectifier matrix having any number of output lines up to $2^n$ where $n$ is the number of associated two-wire input channels comprising rectifier submatrices, a static magnetic core pulse distributor having a plurality of individual input leads corresponding to the number of output lines from said matrix and electrically connected to said output lines, the static magnetic distributor comprising a plurality of said static magnetic storage elements having at least two stable conditions and each set in the same initial storage condition, the static magnetic elements arranged in a plurality of rows, each of said rows consisting of one or more of said magnetic elements, the static magnetic elements of each row further arranged to form a plurality of columns thereby providing a static magnetic element at each coordinate position formed by the rows and columns, each of the static magnetic elements provided with at least an input winding means, an output winding means and a read out winding means, each of the individual input leads further electrically connected and interwoven between the rows and columns of input winding means for the magnetic elements to thereby couple a preselected number of the magnetic elements to physically form a desired symbol, means including the rectifier matrix for introducing an input pulse into preselected input leads, the input pulse thereby coupled to the magnetic elements being effective to reverse the initial storage condition of said elements connected thereto, a common output lead for each row of magnetic elements, a group of pin electrodes arranged in a row, an electrode common to the pin electrodes and spaced slightly away therefrom, means for applying a steady biasing potential between the pin electrodes and the common electrode, means for feeding a dielectric recording medium between the common electrode and the group of pin electrodes and spaced from the latter, each of the common output leads interwoven through and connected to each of the output winding means of each of the magnetic elements of their respective rows, each of the output leads further electrically connected to at least one pin electrode individual to one of the columns of the magnetic elements, a common read out lead for each column of magnetic elements, the common read out lead interwoven through and connected to each of the read out winding means of each of the magnetic elements of their respective row, means for delivering a read-out pulse to each of the common read out leads in a preselected sequence thereby resetting the magnetic elements to their initial storage condition and providing an output pulse therefrom, the output pulses being added to the aforementioned biasing potential and being effective in combination therewith to cause an electrical discharge between the pin electrodes and the recording medium and thereby record an electrostatic latent image on same, and means for rendering the electrostatic latent images visible.

4. In a system for electrically recording intelligence in a dot sequence, the combination, comprising means for receiving coded electrical pulse groups and decoding the electrical pulses to thereby provide an individual output pulse from each of said pulse groups, a static magnetic core pulse distributor having a plurality of individual input leads electrically connected to the decoding means to receive the individual pulses from the latter, the static magnetic distributor comprising a plurality of said static magnetic storage elements having at least two stable conditions and each set in the same initial storage condition, the static magnetic elements arranged in a plurality of rows, each of said rows consisting of one or more of said magnetic elements, the static magnetic elements of each row further arranged to form a plurality of columns thereby providing a static magnetic element at each coordinate position formed by the rows and columns, each of the static magnetic elements provided with at least an input winding means, an output winding means and a read out winding means, each of the individual input leads electrically connected to interleave between the rows and columns of input winding means for the magnetic elements to thereby couple a preselected number of the magnetic elements to physically form a desired symbol, the input pulse thereby coupled to the input lead for the group of preselected magnetic elements being effective to reverse the initial storage condition of said magnetic elements, a common output lead for each row of magnetic elements, the common output lead electrically connected to each output means for each magnetic element individual to said row, a common read out lead for each column of magnetic elements, the common read out lead electrically connected to each read out means for each magnetic element individual to said column, a group of pin electrodes arranged in a row, each of the common output leads for each row electrically coupled to each magnetic element input means for said row and an individual pin electrode, an electrode common to the pin electrodes and spaced slightly away therefrom, means for advancing a dielectric recording medium between the common electrode and the group of pin electrodes and spaced from the latter, and means for delivering a readout pulse to each of the common read out leads thereby resetting the magnetic elements to their initial storage condition and providing an electrical output pulse at each pin electrode associated with same, the output pulses being effective to cause an electrical discharge between the pin electrodes and the recording medium and to record discrete electrostatic latent images on the latter, and means for rendering said images visible.

5. A device for printing information in a dot sequence from electrical pulse coded stimuli arranged in pulse groups representative of a single character comprising, in combination, means for decoding the pulse groups to provide a single pulse representative of a character, a plurality of storage elements each having at least an input means and an output means, a common input lead for each character to be printed adapted to receive only a single pulse from the decoding means, the common input lead further coupled to a predetermined number of the storage elements to store said individual pulse therein, a group of pin electrodes, each of the pin electrodes electrically connected to a corresponding number of individual groups of storage elements, an electrode common to the pin electrodes and spaced slightly away therefrom, a recording member interposed between the common electrode and the pin electrodes and spaced from the latter, the recording medium characterized by having a thermal dielectric coating on at least the surface facing the pin electrodes, means for simultaneously reading out the stored pulses from each of the storage elements of each group in a predetermined order to provide output pulses therefrom, means for amplifying the output pulses derived thereby and coupling same to the individual pin electrode, the amplified voltage pulses effective to cause discrete electrical discharges between the pin electrodes and the recording member, the latter being charged in discrete dot-like areas, means for advancing the recording medium at a predetermined speed in synchronism with the reading out of the pulses from the storage elements, a chamber containing a homogeneous uncharged inking powder having thermal characteristics, means for subjecting the recording member to the inking powder, means for removing the excess inking powder from the recording member, means for heat treating the inked recording member to soften the thermal dielectric surface of same, and means for pressing the inking powder into the softened surface of the recording member thereby rendering the dot-like areas permanent.

6. In a system for electrically recording intelligence in a dot sequence, the combination, comprising means for receiving coded electrical pulse groups and decoding said groups to thereby provide an individual output pulse from each of said pulse groups, a static magnetic core pulse distributor having a plurality of individual input leads electrically connected to the decoding means to receive the individual pulses from the latter means, the static magnetic distributor comprising a plurality of static magnetic storage elements having at least two stable conditions and each set in the same initial storage condition, the static magnetic elements arranged in a plurality of rows, each of said rows consisting of one or more of said magnetic elements, the static magnetic elements of each row further arranged to form a plurality of columns thereby providing a static magnetic element at each coordinate position formed by the rows and columns, each of the static magnetic elements provided with at least an input winding means, an output winding means, and a read out winding means, each of the individual input leads electrically connected to interweave between the rows and columns of input winding means for the magnetic elements to thereby couple a preselected number of the magnetic elements to physically form a desired symbol, the output pulse from the receiving means coupled to the input lead for the group of preselected magnetic elements being effective to reverse the initial storage condition of said magnetic elements, a common output lead for each row of magnetic elements and electrically connected to each output winding means for each magnetic element individual in the row, a common read out lead for each column of magnetic elements and electrically connected to each read out winding means for each magnetic element individual in the column, a group of pin electrodes arranged in a row, each of the common output leads for each row electrically coupled to an individual one of said pin electrodes, an electrode common to the pin electrodes and spaced slightly away therefrom, means for feeding a dielectric recording medium between the common electrode and the group of pin electrodes and spaced from the latter, and means for delivering a read out pulse to each of the common read out leads in a predetermined sequence thereby resetting the magnetic elements to their initial storage condition and providing an electrical output pulse to each pin electrode associated with same, the output pulses effective to cause an electrical discharge between the pin electrodes and the recording medium and thereby record discrete electrostatic latent images on the latter, and means for advancing the recording medium in synchronism with the aforementioned delivery of read-out pulses, a chamber containing an electrically uncharged marking substance of a color contrasting with that of the recording medium, and means for passing the charged recording medium through the marking substance to thereby cause the substance to cling to the latent images and render the same visible.

7. The combination as defined in claim 6 including means for heat treating the recording medium, and means for pressing the marking substance into the recording medium while so heated.

8. A device for printing characters in a dot sequence from coded electrical pulses arranged in pulse groups representative of a single character comprising, in combination, means for decoding the pulse groups to provide a single pulse representative of a character, a plurality of storage elements each having at least an input means and an output means, a common input lead for each character to be printed adapted to receive only a single pulse from the decoding means, the common input further coupled to a predetermined number of storage elements to store said individual pulse therein, a group of pin electrodes, each of the pin electrodes electrically connected to a corresponding number of individual groups of storage elements, an electrode common to the pin electrodes and spaced slightly away therefrom, means for simultaneously reading out the stored pulses from each of the storage elements of each group in a predetermined order to provide output pulses therefrom, means for amplifying the output pulses derived thereby and coupling same to the individual pin electrode, means for continuously advancing a recording member between the common electrode and the pin electrodes and spaced from the latter and at a speed synchronous with the delivery of the pulses to the pin electrodes, means for maintaining the tension of the advancing recording medium constant during its passage between said electrodes, the amplified voltage pulses effective to cause discrete electrical discharges typified by electron avalanches between the pin electrodes and the recording member and thereby charging the latter in discrete dot-like areas, the dot-like areas consisting of a central area of high charge density surrounded by an area of relatively weak charge density of opposite polarity, a chamber containing a homogeneous uncharged inking powder having thermal characteristics, means for subjecting the recording member to the inking powder, vibrating means for removing the excess inking powder from the recording member while allowing the inking powder to remain on the central areas of said dot-like areas to thereby develop a powder image of a character, means for heat treating the recording member bearing the powdered characters to soften the surface of the same, and means for pressing the inking powder into the softened surface of the recording member thereby rendering the powdered characters permanent.

9. In a system for electrically recording intelligence, the combination comprising a rectifier matrix having any number of output lines up to $2^n$ where $n$ is the number of associated two wire input channels comprising rectifier sub-matrices, a static magnetic core pulse distributor having a plurality of individual input leads corresponding to the number of output lines from the rectifier matrix and electrically connected to said lines, the static magnetic distributor comprising a plurality of static magnetic storage elements having at least two stable conditions and each set in the same initial storage condition, the static magnetic elements arraanged in a plurality of rows, each of said rows consisting of one or more of said magnetic elements, the static magnetic elements of each row further arranged to form a plurality of columns thereby providing a static magnetic element at each coordinate position formed by the rows and columns, each of the static magnetic elements provided with an input winding means, an output winding means and a read out winding means, each of the individual input leads electrically connected to interweave between the rows and columns of the input winding means for the magnetic elements to thereby couple a preselected number of the magnetic elements to physically form a desired symbol, the input pulse thereby coupled to the magnetic elements being effective to reverse the initial storage condition of said elements connected thereto, a common read-out lead for each column of said elements and electrically connected to the read-out windings of same, a common output lead for each row of magnetic elements, a recording head comprising a molded insulative body containing a plurality of parallel extending pin electrodes terminating flush with one another and with one end of the body, said body holding the pin electrodes in properly spaced apart relation and maintaining a predetermined resistance between each of the electrodes, an electrode common to the pin electrode and spaced from the flush ends of the pin electrodes, means for applying a predetermined potential between the pin electrodes and the common electrode, each of the common output leads connected to interweave through each of the magnetic elements of their respective rows, each of the output leads further electrically connected to at least one pin electrode individual to one of the rows of the magnetic elements, means for continuously advancing a recording medium between the common electrode and the pin electrodes and spaced from the latter, the recording medium characterized by having dielectric and thermal plastic properties, means for delivering a read out pulse to each of the common read out leads in a preselected sequence thereby resetting the magnetic elements to their initial storage condition and providing an output pulse therefrom, the output pulses solely effective in combination with the aforementioned potential to cause electrical discharges typified by electron avalanches between the pin electrodes and the recording medium and thereby charging the latter in the form of discrete dot-like electrostatic latent images, the discrete latent images being formed by a central zone of high charge density surrounded by an area of relatively weak charge density of opposite polarity, a chamber containing an inking medium of a contrasting color from the recording medium, means for passing the charged recording medium bearing the aforementioned charge through the inking medium thereby causing the inking medium to cling to the latent images as a result of the inductive forces of the latent images, vibrating means engaging the recording medium and shaking the same as it advances to remove excess inking powder therefrom while retaining the powder on the central zone of said latent image, a heated plate, means for continuously advancing the recording medium with the ink clinging to said central zone over the heated plate to soften the dielectric coated surface thereof, a pressure applying device, and means for continuously advancing the recording medium in such softened condition through the pressure device to imbed the inking powder into the softened coated surface of the recording medium for permanent visible retention therein.

10. In a system for forming characters by electrical stimuli, a plurality of pin electrodes arranged in a straight row in closely adjacent parallel relation and having their discharge ends terminating on the same level, means for moving a recording member without interruption along a path of travel extending closely by the discharge ends of the pin electrodes and generally perpendicular to the row formed thereby, a matrix of bi-stable state storage elements subdivided into crossing columns and rows with an individual one of the bi-stable elements located at each coordinate position, a separate input lead for each desired character coupled with those bi-stable elements of the matrix which graphically form the character, means for pulsing a selected one of the character input leads to cause the bi-stable elements to which the lead is coupled to assume a stable state different from the balance of the bi-stable elements of the matrix, an output lead for each row of the matrix operatively coupled to each bi-stable element in its row and further coupled to an individual one of the pin electrodes, said output lead being operable upon a change of state of any one of the bi-stable elements in its row from that set by the pulsing of any selected character input lead to produce an electrical discharge from the pin electrode to which the output lead is coupled, a read out lead for each column of the matrix and coupled to each bi-stable element in its column, said read out lead being operable when pulsed to change the stable state of the bi-stable elements in its column from that set by the pulsing of any of the selected character input leads, and means for pulsing each of said read out leads at a different time and in the order of the columns of the matrix from one side of the selected character to the other side thereof.

11. Apparatus for recording information in symbolic form on a charge retentive medium comprising: in a gaseous ambient atmosphere a pair of closely spaced electrodes, means for mounting a charge retentive medium between said electrodes, means for creating a substantially constant unidirectional bias potential difference between said electrodes, the electric field between said electrodes due to the bias potential being insufficient to produce ionizing discharges in the said ambient atmosphere to establish an electrically charged area on a charge retentive medium mounted by said means between said electrodes, means responsive to a control signal for increasing the potential difference between said electrodes to a print value of potential difference greater than said bias potential, said print value of potential difference being such that the electric field between the electrodes is of sufficient intensity to produce ionizing discharges in the said ambient atmosphere to establish an electrically charged area on a charge retentive medium mounted between said electrodes, the shape of the charged area formed on a charge retentive medium mounted by said means between the electrodes being similar to that of one of said electrodes and representing at least a part of a symbol.

12. Apparatus for recording information in symbolic form comprising: a matrix of pin electrodes, a base, means spacing the ends of the pin electrodes closest to the base a substantially uniform distance from the base, a charge retentive medium between the pin electrodes and the base, means for causing movement of said charge retentive medium between the pin electrodes and the base, means for establishing a bias voltage between each of the pin electrodes and the base which is of insufficient magnitude to create charged areas on the charge retentive medium, and means for increasing the voltages on selected pin electrodes to a recording voltage, the magnitude of the recording voltage being such as to establish charged areas on the charge retentive medium between the electrodes, the shape of the charged areas on the charge retentive medium being substantially coaxial with the electrodes which are at the recording voltage, the charged areas on the recording medium defining symbols, and means for rendering said symbols permanently detectable.

13. Apparatus for recording information in symbolic form on an initially uncharged electric charge retentive medium, comprising: a base; a plurality of electrodes spaced equidistantly from one another, aligned in a row, and spaced a uniform distance from said base; a charge retentive medium; means for mounting the charge retentive medium between said electrodes and said base; means for creating a substantially constant unidirectional bias potential difference between the base and each of said electrodes, the magnitude of the bias potential being insufficient to create electrically charged areas on the charge retentive medium; means for increasing the potential difference between selected ones of said electrodes and said base to a printing potential, the magnitude of the printing potential being greater than said bias potential and being sufficient to create electrically charged areas on the charge retentive medium, the shape of each charged area formed on the charge retentive medium conforming to that of the electrode forming said charged area; each of said charged areas representing at least a part of a symbol; and means for rendering said charged areas substantially permanently visible, said latter means including means for bringing the charge retentive medium in contact with an uncharged mass of powdered ink, substantially removing all said ink from the uncharged areas of the medium, and permanently securing to the medium the ink attracted to its charged areas.

14. Recording apparatus comprising a base electrode; a plurality of pin electrodes; means for mounting one end of each of said pin electrodes substantially equidistantly from the base electrode; said one end of said pin electrodes being spaced apart equidistantly and insulated from one another; a recording medium having at least one surface formed of charge retentive material; means for causing substantially constant relative movement of said recording medium with respect to, and between, the base electrode and the pin electrodes; means for establishing a substantially unidirectional constant bias voltage between each of the pin electrodes and the base electrode; said bias voltage producing a bias electric field between each pin electrode and base electrode; the intensity of the bias field being insufficient to form a charged area on the portion of the recording medium between each pin electrode and said base; a plurality of voltage pulse means, one for, and connected to, each pin electrode; control means for causing selected ones of said voltage pulse means to apply a voltage pulse to increase the voltage of the pin electrode to which the pulse means is connected; each of said voltage pulses increasing the intensity of the electric field between the pin electrode to which it is applied and the base to a sufficient value to form a charged area on the charge retentive surface of said recording medium; the charged area being formed on that portion of the recording medium located between the pin electrode to which the voltage pulse is applied and the base, the charged areas of the charge retentive material defining predetermined symbols, and means for rendering said symbols visible.

15. Recording apparatus comprising: a plurality of pin electrodes; at least a portion of each of said pin electrodes substantially determining a plane, the portions of said electrodes in the plane being substantially parallel and spaced equidistantly apart; a base electrode, the distance between one end of each pin electrode and the base electrode being substantially equal; a recording medium having at least one surface formed of a charge retentive material, said charge retentive material initially being substantially electrically uncharged; means for causing substantially constant relative movement of said recording medium between the base electrode and pin electrodes, the direction of movement of said recording medium being substantially perpendicular to said plane; means for establishing a substantially constant unidirectional bias voltage between each of the pin electrodes and base electrode, said bias voltage being insufficient to establish charged areas on the recording medium; a plurality of voltage pulse means, one voltage pulse means being connected to each of said pin electrodes, each voltage pulse means, responsive to a control signal, producing a print voltage pulse, each print voltage pulse increasing the voltage between the pin electrode to which it is connected and the base electrode to a magnitude which forms a charged area on the charged retentive surface of said medium, the charged area being formed on that portion of the recording medium located between the pin electrode to which the voltage pulse is applied and the base electrode at the time the voltage pulse is applied, each of said charged areas being substantially concentric with the end portion of the pin electrode producing said area; control means for producing control signals which cause the voltage pulse means to apply voltage pulses to said pin electrodes in such sequence and order that the charged area on the recording medium form predetermined symbols, means for bringing the charge retentive material into intimate contact with an uncharged inking material to render said charged areas visible, and means for permanently fixing said inking material to said recording medium whereby the symbolic information placed on the recording medium is rendered substantially permanently visible.

16. Apparatus for electrically recording symbols comprising, in combination, first electrical conductive members, at least one second conductive member spaced apart from said first electrical conductive members, means for feeding a dielectric recording medium between the said first conductive members and the said second conductive members and spaced from at least one of the groups of first and second conductive members, means for applying between the said first and said second conductive members a biasing voltage insufficient to produce an electrical discharge in the ambient atmosphere between said first and said second conductive members, means for applying between said first and said second conductive members in addition to said biasing voltage a print voltage pulse of predetermined amplitude sufficient to produce through the said ambient atmosphere a substantially silent and invisible ionizing electrical discharge between one of the groups of conductive members and a recording medium fed by said means and form on such a medium a discrete latent charge pattern constituting at least a part of a symbol, and means adapted to render such a charge pattern visible.

17. In apparatus for recording symbols, comprising, in combination, at least a single pair of electrically conductive members spaced from one another, advancing means for continuously advancing a dielectric storage medium between and spaced from at least one of the conductive members, means for biasing the said conductive members at a voltage insufficient to produce an electrical discharge through the ambient atmosphere around the said conductive members, control means for applying between the said conductive members in synchronism with the operation of the said advancing means printing voltage pulses, of amplitude sufficient, when added to the said biasing voltage, to produce through the ambient atmosphere an electrical discharge between one of the conductive members and a storage medium advanced by by advancing means and form on such medium a discrete electrostatic latent image forming at least a portion of a symbol.

18. Apparatus for electrically recording symbols comprising, in combination, a multiplicity of storage elements, at least one input means for each symbol to be recorded, each said input means being so connected as to store an electrical signal applied to said input means in those and only those storage elements corresponding to the elements of which the record of said symbol is to be composed; read-out means for causing the reading out and simultaneous restoring of successive groups of said storage elements; output means for transmitting by a separate conductor the output signal of each said storage element in any said group; a multiplicity of discharge electrodes; a multiplicity of voltage pulse producing means each one actuated individually by electrical impulses on one said output means to produce at a selected one of said electrodes a discharge through the ambient atmosphere; advancing means for advincing a dielectric recording medium adjacent to said electrodes, and between said electrodes and electrode means common to more than one of said multiplicity of discharge electrodes; means for synchronizing the operation of said advancing means with the reading out of said storage elements so that the selective discharges in the ambient atmosphere from said discharge electrodes to a dielectric recording medium advanced by said advancing means produce on such medium a pattern of electric charges representative of a symbol; and means for developing such charge pattern by causing the adherence thereto of pigment powder not charged except by induction from such charge pattern.

19. Apparatus for electrically recording symbols comprising, in combination, a multiplicity of storage elements; at least one input means for each symbol to be recorded, each said input means being so connected as to store an electrical signal applied to said input means in those and only those storage elements corresponding to the elements of which the record of said symbol is to be composed; read-out means for causing the reading out of successive groups of said storage elements; output means for transmitting by a separate conductor the output signal of each said storage element in any said group; a multiplicity of discharge electrodes; at least one auxiliary electrode; means for applying between said discharge electrodes and said auxiliary electrode a bias potential difference insufficient to produce an electrical discharge in the vicinity of said discharge electrodes; a multiplicity of voltage pulse producing means each one actuated individually by electrical impulses on one said output means to produce at a selected one of said discharge electrodes a voltage sufficient, in conjunction with the said bias potential difference, to produce an electrical discharge in the ambient atmosphere; means for advancing a recording dielectric medium adjacent to said electrodes in proximity thereto to permit the formation of patterns of electrostatic charges on such a recording dielectric medium; and means for developing such charge pattern by causing the adherence thereto of substantially uncharged pigment.

20. Apparatus for electrically recording signals received as voltage pulses comprising, in combination, means for decoding voltage pulses representative of characters to be recorded into an individual voltage pulse for each character; a plurality of storage elements; means for distributing each said individual voltage pulse to certain elements of said plurality of storage elements, uniquely selected to store the character represented by said individual pulse, and storing the same therein; a pair of spaced apart electrical conductive members; means for feeding a dielectric recording medium between the said conductive members and spaced from at least one of the same; means for reading out voltage pulses stored in selected elements of the plurality of storage elements in a preselected sequence and delivering the same to the conductive members and for simultaneously restoring said selected elements, each said voltage pulse being effective to cause an electrical discharge between one of the conductive members and a recording medium fed between the members by said feeding means and to thereby charge such a fed medium in the form of an electrostatic latent image; inking means for subjecting a recording medium thus fed and charged to uncharged inking powder to cause the same to cling to the charged image thereon; and means for permanently fixing such inking powder in the surface of a recording medium thus fed, charged and inked.

21. A system for electrically recording information on a recording member comprising, in combination, a recording head consisting of a plurality of pin electrodes supported in an insulating medium, an electrode common to said pin electrode and spaced closely adjacent to one of the ends thereof, means to bias each of the pins at a preselected voltage and polarity with respect to said common electrode, voltage amplification means individually connected to each of the pin electrodes of the recording head, control means for delivering voltage pulses to preselected ones of said amplifying means, each of said voltage amplification means in response to each voltage pulse applied to it applying a print voltage pulse to the pin electrode to which it is connected, a recording member having a coating on one surface characterized by being dielectric and thermoplastic, means for continuously advancing the recording member between the common electrode and the pin electrodes and with the dielectric coated surface spaced from the latter, the recording medium being thus positioned as it is advanced to receive an electrical discharge from those pin electrodes to which print voltage pulses are applied and to form an electrostatic latent image on the coating thereof, a chamber containing a substantially uncharged inking powder of a color contrasting with that of the coated surface of the recording member and capable of adhering to at least the electrostatic latent images on the advancing recording medium, means for continuously advancing the recording member through the inking powder chamber, vibrating means engaging the recording member and shaking the same as it advances to remove excess inking powder therefrom, a heated plate, means for continuously advancing the recording member with the inking powder adhered thereto over the heated plate to soften the dielectric coated surface thereof, a pressure applying device, and means for continuously advancing the recording member in such softened condition through the pressure device to imbed the inking powder into the softened coated surface of the recording member for permanent visible retention therein.

22. In apparatus for recording intelligence received as electrical signals, the combination of at least a single pair of electrically conductive members slightly spaced apart a predetermined distance from one another, means for advancing a recording medium having a dielectric surface between the conductive members and in spaced relation to one of the conductive members, a pulse distributor circuit for receiving electrical signals and operable to couple the same across the conductive members as each electrical signal is received to produce an electrical discharge between the recording medium and the conductive member spaced therefrom to charge the dielectric surface of the recording medium with separated areas of latent electrostatic images, a chamber containing an inking powder having thermoplastic properties and further having a color contrasting with that of the dielectric surface of the recording medium, means for advancing the recording medium thus charged through the inking powder, means to remove the excess inking powder adhering to recording medium while maintaining the same on at least a portion of the latent electrostatic images, means for subsequently heat treating the recording medium with the inked images thereon, and means operable while the recording member and the inked images thereon retain heat produced by said heat treating means for subjecting the recording member and its inked images to squeezing pressure to permanently affix the ink powder to the dielectric surface of the recording medium.

23. Apparatus for electrically recording symbols comprising, in combination, a plurality of pin electrodes arranged in a row, an insulative housing for the pin electrodes maintaining a predetermined electrical resistance between each of said electrodes, said housing further maintaining one end of the pin electrodes flush with one face of the housing, an electrode common to said pin electrodes and spaced slightly away therefrom, means for establishing a bias voltage between each of the pin electrodes and the common electrode, means for advancing a recording member having a dielectric surface between the common electrode and the pin electrodes and spaced from the latter, circuit means associated with each pin electrode and the common electrode for delivering electrical stimuli to same, the electrical stimuli effective to cause an electrical discharge between each pin electrode and the record member thereby forming discrete latent electrostatic images on the latter, control means for causing said circuit means to deliver electrical stimuli in synchronism with the advancement of the recording member so that said images form symbols, an inking powder having thermoplastic characteristics, means for subjecting the recording member to the inking powder, means for removing the excess inking powder from the recording member while maintaining the same on desired portions of said images, means for heat treating the recording member bearing the retained powder images to soften the same, and means for pressing the inking powder into the recording member while the same are under the influence of the heat treatment.

24. In a system for electrically recording intelligence in a dot sequence, the combination, comprising a rectifier matrix having any number of output lines up to $2^n$ where $n$ is the number of associated two-wire input channels comprising rectifier submatrices, a static magnetic core pulse distributor having a plurality of individual input leads corresponding to the number of output lines from said matrix and electrically connected to said output lines, the static magnetic distributor including a plurality of static magnetic storage elements having at least two stable conditions and each set in the same initial storage condition, the static magnetic elements arranged in a plurality of rows, each of said rows consisting of one or more of said magnetic elements, the static magnetic elements of each row further arranged to form a plurality of columns thereby providing a static magnetic element at each coordinate position formed by the rows and columns, each of the static magnetic elements provided with at least an input winding means, an output winding means and a read out winding means, each of the individual input leads further interwoven between the rows and columns of the distributor and electrically connected to the input winding means of certain of the magnetic elements to thereby couple a preselected number of the magnetic elements to physically form a different desired symbol, means including the rectifier matrix for introducing an input pulse into a selected input lead, the input pulse delivered to the selected input lead and thence to the input winding means of the magnetic elements associated therewith being effective to reverse the initial storage condition of the magnetic elements coupled thereto, a common output lead for each row of magnetic elements and electrically connected to the output winding thereof, a group of pin electrodes arranged in a row, an electrode common to the pin electrodes and spaced slightly away therefrom, means for feeding a dielectric recording medium between the common electrode and the group of pin electrodes and spaced from the latter, each of said common output leads further electrically connected to at least one pin electrode individual to one of the rows of the magnetic elements, a common read out lead for each column of magnetic elements and electrically connected to each of the read out winding means of each of the magnetic elements of its respective column, means for delivering a read out pulse to the common read out leads at different times and in the order of the positions of their respective columns in the distributor thereby successively resetting magnetic elements of the distributor column by column to their initial storage condition and providing output pulses therefrom, the output pulses being effective to cause electrical discharges between the pin electrodes and the recording medium and thereby record latent electrostatic images on the medium, and means for rendering the electrostatic latent images on the recording medium visible.

25. In a system for electrically recording intelligence in a dot sequence, the combination comprising means for receiving coded groups of electrical signals and for decoding the electrical signals to thereby provide an individual output pulse from each of said signal groups, a magnetic core matrix having a plurality of individual input leads electrically connected to the decoding means to receive the individual pulses from the latter, the magnetic matrix comprising a plurality of magnetic storage elements each having two stable states and adapted to be set in the same initial storage state, the magnetic elements being arranged in a plurality of rows, each of said rows consisting of one or more of said magnetic elements, the magnetic elements of each row further being arranged to form a plurality of columns thereby providing a magnetic element at each intersection of the rows and columns thereby providing a magnetic element at each intersection of the rows and columns of the matrix, each of the magnetic elements being provided with at least an input winding means, an output winding means and a read out winding means, each of the said individual input leads being interwoven in a different manner between the rows and columns of the matrix and electrically connected to the input winding means of certain of the magnetic elements to thereby couple a preselected number of the magnetic elements in a physical relationship characteristic of a different symbol, the input pulse delivered to the input lead for each preselected number of magnetic elements being effective to reverse the initial storage state thereof, a common output lead for each row of magnetic elements, each common output lead being electrically connected to the output winding means of the magnetic elements individual to its row, a common read out lead for each column of magnetic elements, each common read out lead being electrically connected to the read out winding means of the magnetic elements individual to its column, a group of pin electrodes arranged in a row, each of the common output leads for each row being electrically coupled to an individual pin electrode, an electrode common to the pin electrodes and spaced slightly away therefrom, means for advancing a dielectric recording medium between the common electrode and the group of pin electrodes and spaced from the latter, the direction of advance of the recording medium being transverse to the row of pin electrodes, and means for delivering a read out pulse sequentially in time to each of the read out leads and in the order of the columns from one to the other side of the matrix thereby successively resetting magnetic elements of the matrix column by column to their initial storage state, the resetting of the magnetic elements providing an electrical output pulse on its associated output lead and at each pin electrode associated therewith, the output pulses being effective to cause electrical discharges between the pin electrodes and the recording medium and to record discrete electrostatic latent images on the latter, and means for rendering such images visible.

26. Apparatus for recording information in symbolic form comprising: a matrix of pin electrodes, base electrode means, means spacing the ends of the pin electrodes closest to the base electrode means a substantially uniform distance therefrom, means for advancing an electrostatic charge retentive recording medium between the pin electrodes and the base electrode means, means for establishing a bias voltage between each of the pin electrodes and the base electrode means which is of insufficient magnitude to create charged areas on the charge retentive recording medium, and means for increasing the voltages on selected pin electrodes to a recording voltage, the magnitude of the recording voltage being such as to establish charged areas on that portion of the recording medium between the pin electrodes and the base electrode means, the shape of the charged areas on the recording medium being substantially coaxial with the pin electrodes which are at the recording voltage, the charged areas on the recording medium defining symbols, and means for rendering said symbols permanently detectable.

27. Apparatus for recording information in symbolic form on an initially uncharged electric charge retentive medium, comprising; a base electrode; a plurality of print electrodes spaced equidistantly from one another, aligned in a row, and spaced a uniform distance from said base electrode; means for positioning an electrostatic charge retentive recording medium between said print electrodes and said base electrode; means for creating a substantially constant unidirectional electrical bias potential difference between the base electrode and each of said print electrodes, the magnitude of the bias potential being insufficient to create electrically charged areas on the charge retentive recording medium; means for increasing the electrical potential difference between selected ones of said print electrodes and said base electrode to a printing potential, the magnitude of the printing potential being greater than said bias potential and being sufficient to create electrically charged areas on the charge retentive recording medium, the shape of each such charged area formed on the charge retentive medium conforming to that of the print electrode forming said charged area; each of said charged areas representing at least a part of a symbol; and means for rendering said charged areas substantially permanently visible, said last means including means for bringing the charged recording medium in contact with an uncharged mass of powdered ink, for substantially removing all said ink from the uncharged areas of the recording medium, and for permanently securing to the recording medium the ink attracted to its charged areas.

28. Character forming apparatus, including, in combination, a plurality of bistable storage elements arranged in a matrix network of columns and rows, each of the bistable storage elements provided with at least an input means, read out means and an output means, each of said input means electrically connected to one or more of the bistable elements to physically form a desired character, the read out means comprising a plurality of individual electrical leads each coupled to the bistable elements of a separate column of said elements, the output means comprising a plurality of individual electrical leads each coupled to the bistable elements of a separate row of said elements, means for pulsing the electrically connected input means to set their respective elements in a stable state differing from the states of the remaining elements in the matrix, and means for pulsing the individual leads of the read out means column by column and successively from one side of the matrix network to the other side thereof to reset said respective elements from said differing state and to provide output signals along the electrical leads of said separate rows.

29. In a system for forming characters in a dot sequence by means of distributed electrical stimuli, the combination, comprising a plurality of magnetic storage elements each having two stable conditions and each being adapted to be set in the same initial storage condition, the magnetic storage elements being arranged in a matrix formed of a plurality of rows and columns with each of said rows and columns including one or more of said elements and with each element individually located at the intersection of each row and column; each of the magnetic elements being provided with at least an input winding means, an output winding means and a read out winding means; an individual input lead for each character being interwoven through the matrix and electrically connected to a different group of input winding means of the elements to couple thereby a preselected number of the magnetic elements to physically form the character; means for selecting one of said characters and for delivering an input pulse to the individual input lead associated therewith in order to effect a reversal of the initial storage condition of those magnetic elements whose input windings are connected thereto; a common output lead for each row of magnetic elements, each of the common output leads being electrically connected to the output winding means of each of the magnetic elements of its respective row; a common read out lead for each column of magnetic elements, each of the common read out leads being electrically connected to the read out winding means of each of the magnetic elements of its respective column; and means for delivering a read out pulse to each of the common read out leads sequentially in time and in the order of the columns from one to the other side of the matrix to thereby reset the reversely conditioned magnetic elements to their initial storage condition; and means electrically connected to each of said output leads and responsive to an output pulse received thereby as a result of the resetting of the magnetic elements for producing an image of the selected character.

30. In a character forming apparatus, the combination comprising: a plurality of bistable storage elements arranged in a matrix of two groups of intersecting perpendicularly related lines, each of said storage elements having a first stable state and a second stable state, each of the storage elements being provided with readout means and output means, a plurality of input means, each input means corresponding to a different character and being connected to one or more of the bistable elements to physically form the character corresponding to each of said input means, each input means, when energized, placing those bistable storage elements to which it is connected in their second stable state, each readout means, when energized, placing the bistable storage elements to which it is connected in its first stable state, the change of state of each storage element from its second stable state to its first stable state causing the output means of the element to produce an output signal, a plurality of output leads associated with one of said groups of lines of the matrix, each output lead corresponding to one line of its group and being electrically connected to the output means of the bistable storage elements of its respective line, each of said output leads being adapted to receive an output signal upon the change of state of any bistable storage element in its line, a plurality of readout leads associated with the second of said groups of lines of the matrix, each read out lead corresponding to one line of its group and being electrically connected to the readout means of the bistable storage elements of its respective line, and means for pulsing said readout leads sequentially in time and in the order of their respective lines of the matrix from one side to the other side thereof.

References Cited in the file of this patent

UNITED STATES PATENTS

| | | |
|---|---|---|
| Re. 23,713 | Hunt | Sept. 22, 1953 |
| 2,035,475 | Hay | Mar. 31, 1936 |
| 2,200,741 | Gray | May 14, 1940 |
| 2,221,776 | Carlson | Nov. 19, 1940 |
| 2,502,419 | Cannon et al. | Apr. 4, 1950 |
| 2,540,081 | Alden | Feb. 6, 1951 |
| 2,575,017 | Hunt | Nov. 13, 1951 |
| 2,691,154 | Rajchman | Oct. 5, 1954 |
| 2,691,155 | Rosenberg et al. | Oct. 5, 1954 |
| 2,716,048 | Young | Aug. 23, 1955 |
| 2,719,965 | Person | Oct. 4, 1955 |
| 2,769,680 | Beck | Nov. 6, 1956 |
| 2,771,336 | MacGriff | Nov. 20, 1956 |
| 2,777,745 | McNaney | Jan. 15, 1957 |
| 2,844,812 | Auerbach | July 22, 1958 |
| 2,878,313 | Tolson et al. | Mar. 17, 1959 |
| 2,919,170 | Epstein | Dec. 29, 1959 |
| 2,920,312 | Gordon et al. | Jan. 5, 1960 |
| 2,931,014 | Buchholz | Mar. 29, 1960 |

FOREIGN PATENTS

| | | |
|---|---|---|
| 1,077,037 | France | Apr. 28, 1954 |

OTHER REFERENCES

"A High Speed Magnetic-Core Output Printer" by Bernard M. Gordon, Proc. Assn. for Comp. Machinery, September 1952; pp. 6–12 (copy found in 340—174C Lit., Div. 42).

Static Magnetic Matrix Memory and Switching Circuit by J. A. Rajchman, RCA Review June 1952, pp. 183–201 (copy found in 340—174C, Div. 42).

Publication No. 25, "High Speed Number Generator Uses Magnetic Memory Matrices" by An Wang, Electronics, May 1953, pp. 200–253. Copy found in Div. 42, 340—174C.

Disclaimer 3,012,839.—*Herman Epstein*, West Chester, and *Frank T. Innes*, Malvern, Pa. ELECTROGRAPHIC PRINTER. Patent dated Dec. 12, 1961. Disclaimer filed Dec. 6, 1962, by the inventors and the assignee, *Burroughs Corporation.*

Hereby enter this disclaimer to claims 11, 16 and 17 of said patent.

[*Official Gazette January 1, 1963.*]